United States Patent
Fukunaga et al.

(10) Patent No.: US 6,771,668 B2
(45) Date of Patent: *Aug. 3, 2004

(54) INFORMATION PROCESSING APPARATUS AND METHOD AND STORAGE MEDIUM

(75) Inventors: Koji Fukunaga, Tokyo (JP); Kiyoshi Katano, Chiba (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,503

(22) Filed: Apr. 20, 1998

(65) Prior Publication Data

US 2003/0202539 A1 Oct. 30, 2003

(30) Foreign Application Priority Data

Apr. 21, 1997 (JP) .............................................. 9-103679

(51) Int. Cl.[7] .............................. G06F 13/36; H04J 1/00
(52) U.S. Cl. ...................... 370/489; 710/113; 370/447; 370/461
(58) Field of Search ................................ 370/362, 465, 370/468, 489, 490, 496, 502, 447, 461; 710/107, 113

(56) References Cited

U.S. PATENT DOCUMENTS

| | | | | |
|---|---|---|---|---|
| 5,758,075 A | * | 5/1998 | Graziano et al. | 395/200.8 |
| 5,790,743 A | * | 8/1998 | Sugiyama et al. | 386/52 |
| 5,937,175 A | * | 8/1999 | Sescila, III et al. | 395/309 |
| 5,940,600 A | * | 8/1999 | Staats et al. | 395/287 |
| 5,942,983 A | * | 8/1999 | Iijima et al. | 340/825.06 |
| 5,953,511 A | * | 9/1999 | Sescila, III et al. | 395/309 |
| 5,983,301 A | * | 11/1999 | Baker et al. | 710/113 |
| 5,991,520 A | * | 11/1999 | Smyers et al. | 710/100 |

* cited by examiner

Primary Examiner—Alpus H. Hsu
Assistant Examiner—Toan D. Nguyen
(74) Attorney, Agent, or Firm—Fitzpatrick, Cella, Harper & Scinto

(57) ABSTRACT

A host device logs in a printer as a print data transfer destination to acquire type information of the printer and issues SB_CONT.req to determine whether a cycle master necessary for isochronous transfer is present on a serial bus. The print data transfer mode and transfer parameter are set in accordance with the presence/absence of the cycle master and the acquired type information. If the cycle master is present on the serial bus, isochronous transfer is set as the transfer mode; otherwise, asynchronous transfer is set as the transfer mode. Therefore, even when devices without any cycle master function are connected, or no cycle master is present on the bus, print data can be transferred from the host device to the printer.

19 Claims, 43 Drawing Sheets

POWER-SOURCE LINE
8-40V DC, MAXIMUM CURRENT 1.5A

TWISTED PAIR SIGNAL LINES

CROSS-SECTION OF CABLE

SIGNAL-LINE SHIELD

CLOCK : EXCLUSIVE-OR SIGNAL BETWEEN DATA AND STROBE

BRANCH : NODE WITH TWO OR MORE NODE CONNECTIONS

LEAF : NODE WITH SINGLE PORT CONNECTION

☐ : PORT
c : PORT CORRESPONDING TO CHILD NODE
p : PORT CORRESPONDING TO PARENT NODE

FIG. 11
CSR CORE REGISTER

| OFFSET (hexadecimal) | REGISTER NAME | FUNCTION |
|---|---|---|
| 000 | STATE_CLEAR | INFORMATION ON STATUS AND CONTROL |
| 004 | STATE_SET | INFORMATION ON WRITE ENABLE/DISABLE STATUS OF STATE_CLEAR |
| 008 | NODE_IDS | BUS ID + NODE ID |
| 00C | RESET_START | TO RESET BUS BY WRITING INTO THIS AREA |
| 010~014 | INDIRECT_ADDRESS, INDIRECT_DATA | REGISTER TO ACCESS ROM AREA GREATER THAN 1KB |
| 018~01C | SPLIT_TIMEOUT | TIMER VALUE TO DETECT TIME-OUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT INSTALLED IN IEEE 1394 |
| 050~054 | INTERRUPT_TARGET, INTERRUPT_MASK | REGISTER OF INTERRUPTION NOTIFICATION |
| 058~07C | CLOCK_VALUE, CLOCK_TICK_PERIOD, CLOCK_STOROBE_ARRIVED, CLOCK_INFO | NOT INSTALLED IN IEEE 1394 |
| 080~0FC | MESSAGE_REQUEST, MESSAGE_RESPONSE | REGISTER FOR MESSAGE NOTIFICATION |
| 100~17C | | RESERVATION |
| 180~1FC | ERROR_LOG_BUFFER | TO RESERVE FOR IEEE 1394 |

FIG. 12
SERIAL BUS REGISTER

| OFFSET (hexadecimal) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER RELATING TO POWER SUPPLY |
| 20C | POWER_SOURCE | |
| 210 | BUSY_TIMEOUT | TO CONTROL RETRY IN TRANSACTION LAYER |
| 214~218 | | RESERVATION |
| 21C | BUS_MANAGER_ID | NODE ID OF BUS MANAGER |
| 220 | BANDWIDTH_AVAILABLE | TO MANAGE ISOCHRONOUS TRANSFER BAND |
| 224~228 | CHANNELS_AVAILABLE | TO MANAGE CHANNEL NUMBER FOR ISOCHRONOUS TRANSFER |
| 22C | MAINT_CONTROL | REGISTER FOR DIAGNOSIS |
| 230 | MAINT_UTILITY | |
| 234~3FC | | RESERVATION |

FIG. 13

SERIAL-BUS NODE RESOURCE REGISTER

| OFFSET (hexadecimal) | REGISTER NAME | FUNCTION |
|---|---|---|
| 800~FFC | | RESERVATION |
| 1000~13FC | TOPOLOGY-MAP | INFORMATION ON SERIAL BUS STRUCTURE |
| 1400~1FFC | | RESERVATION |
| 2000~2FFC | SPEED-MAP | INFORMATION ON TRANSFER SPEED OF SERIAL BUS |
| 3000~FFFC | | RESERVATION |

FIG. 14

MINIMUM FORMAT CONFIGURATION ROM

| 01 | VENDOR ID |
|---|---|

FIG. 15

GENERAL FORMAT CONFIGURATION ROM

| LENGTH OF bus_info_block | LENGTH OF ROM | CRC |
|---|---|---|
| bus_info_block (ASCII CODE OF 1394 BUS AND INFORMATION ON WHETHER OR NOT NODE HAS CAPABILITIES OF ISOCHRONOUS RESOURCE MANAGEMENT, CYCLE MASTER, AND BUS MANAGEMENT) | | |
| root_directory (INDICATE VENDOR ID AND NODE FUNCTION) | | |
| unit_directories (INDICATE UNIT TYPE AND DRIVER SOFT VERSION) | | |
| root & unit_leaves | | |
| vendor_dependent_information | | |

ISOCHRONOUS DATA PACKET

FIG. 25

| ABBREVIATION | NAME | CONTENT |
|---|---|---|
| destination_ID | destination identifier | ID OF DESTINATION NODE (ASYNCHRONOUS ONLY) |
| tl | transaction label | LABEL INDICATING A SERIES OF TRANSACTIONS (ASYNCHRONOUS ONLY) |
| rt | retry code | CODE INDICATING RETRANSMISSION STATUS (ASYNCHRONOUS ONLY) |
| tcode | transaction code | CODE INDICATING PACKET TYPE (ASYNCHRONOUS ONLY) |
| pri | priority | PRIORITY ORDER (ASYNCHRONOUS ONLY) |
| source_ID | source identifier | SOURCE NODE (ASYNCHRONOUS ONLY) |
| destination_offset | destination memory address | MEMORY ADDRESS OF DESTINATION NODE (ASYNCHRONOUS ONLY) |
| rcode | response code | RESPONSE STATUS (ASYNCHRONOUS ONLY) |
| quadiet_data | quadiet(4bytes) data | 4-BYTE LENGTH DATA (ASYNCHRONOUS ONLY) |
| data_length | length of data | LENGTH OF data_field (EXCEPT pad bytes) |
| extended_tcode | extended transaction code | EXTENDED TRANSACTION CODE (ASYNCHRONOUS ONLY) |
| chanel | isochronous identifier | IDENTIFICATION OF ISOCHRONOUS PACKET |
| sy | synchronization code | SYNCHRONIZATION OF VIDEO IMAGE AND AUDIO INFORMATION |
| cycle_time_data | contents of the CYCLE_TIME register | CYCLE TIMER REGISTER VALUE OF CYCLE MASTER NODE (CYCLE PACKET ONLY) |
| data_field | data + pad bytes | DATA STORAGE (ISOCHRONOUS AND ASYNCHRONOUS) |
| header_CRC | CRC for header field | CRC FOR HEADER |
| data_CRC | CRC for data field | CRC FOR DATA |
| tag | tag label | ISOCHRONOUS PACKET FORMAT |

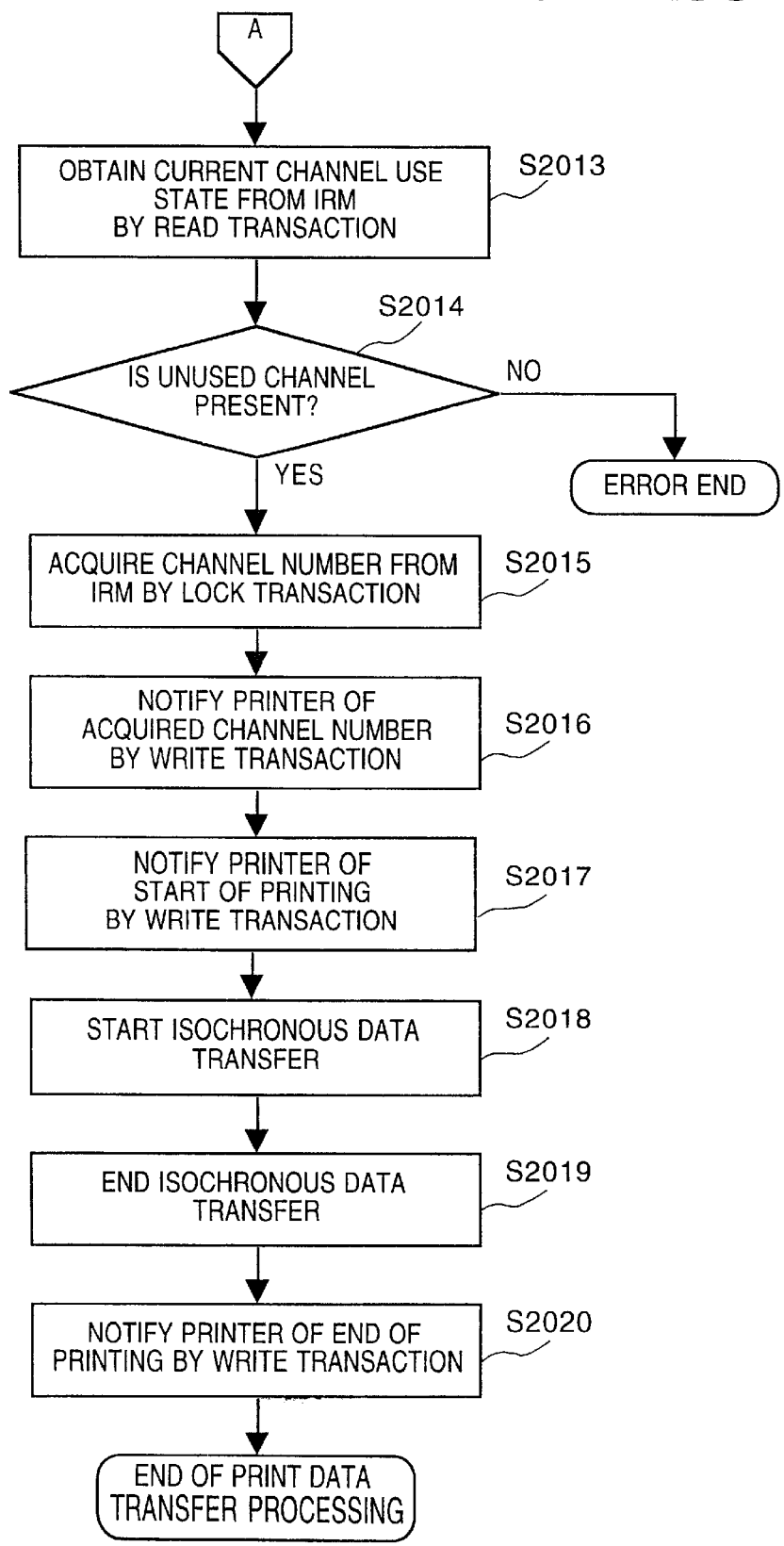

CONFIGURATION ROM OF IJP

CONFIGURATION ROM OF LBP

REGISTER SPACE OF IJP

REGISTER SPACE OF LBP

INFORMATION PROCESSING APPARATUS AND METHOD AND STORAGE MEDIUM

BACKGROUND OF THE INVENTION

1. Field of the Invention

The present invention relates to an information processing apparatus and method, and a storage medium and, more particularly, to an information processing apparatus connected by a serial interface such as IEEE 1394, a method therefor, and a storage medium which stores a computer program product for realizing the method.

2. Description of Related Art

When a plurality of devices are to be connected by a bus using a digital interface defined as IEEE 1394-1995 (High Performance Serial Bus) (to be referred to as a "1394 serial bus" hereinafter), e.g., when a printer and a personal computer or a digital camera as a host device are to be connected using the 1394 serial bus, two methods, i.e., isochronous transfer and asynchronous transfer can be used to transfer data between the devices.

Isochronous transfer can advantageously synchronize data transfer timing to define the relationship between the time and amount of data to be transferred. For isochronous transfer, however, a synchronous packet (CSP: Cycle Start Packet) for synchronization must be periodically transmitted. A node which transmits this CSP is called a cycle master, so a node must have a function to serve as a cycle master (to be simply referred to as a "cycle master function" hereinafter).

To the contrary, asynchronous transfer cannot establish a predetermined relationship between the time and amount of data to be transferred. However, since the cycle master is unnecessary, the cycle master function need not be incorporated, resulting in a lower device cost. The cost of a consumer device such as a digital camera may be reduced by omitting the cycle master function.

Although a bus requires at least one node having the cycle master function, only devices without any cycle master function may be connected to the bus. In such a case, data cannot be transferred because no cycle master is present. Therefore, even when, e.g., a digital camera without any cycle master function and a printer are directly connected by the IEEE 1394 serial interface, neither sides can obtain information, so printing cannot be performed.

SUMMARY OF THE INVENTION

It is an object of the present invention to provide an information processing apparatus capable of data transfer even when devices without any cycle master function are connected, or no cycle master is present on a bus, a method therefor, and a storage medium which stores the method. According to an aspect of the present invention, there is provided an information processing apparatus for controlling data transfer between devices which are connected by a serial bus, said apparatus comprising: first determination means for determining whether a cycle master necessary for isochronous transfer is present on the serial bus; second determination means for determining whether a destination device of data transfer can be performed the isochronous transfer; and setting means for setting a transfer mode of data transfer in accordance with the presence/absence of the cycle master and the possibility/impossibility of the isochronous transfer of the destination device.

According to another aspect of the present invention, there is provided an information processing apparatus for controlling data transfer between devices which are connected by a serial bus, said apparatus comprising: acquisition means for logging in a data transfer destination to acquire type information of the transfer destination; first determination means for determining whether a cycle master necessary for isochronous transfer is present on the serial bus; second determination means for determining whether a destination device of data transfer can be performed the isochronous transfer; and setting means for setting a transfer mode and a transfer parameter of data transfer in accordance with the presence/absence of the cycle master, the possibility/impossibility of the isochronous transfer of the destination device and the type information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a table showing functions of a CSR architecture of the 1394 serial bus;

FIG. 12 is a table showing registers for the 1394 serial bus;

FIG. 13 is a table showing registers for node resources of the 1394 serial bus;

FIG. 14 is an example of a minimum format of a configuration ROM of the 1394 serial bus;

FIG. 15 is an example of a general format of the configuration ROM of the 1394 serial bus;

FIG. 25 is a table showing the details of packet format fields for the isochronous transfer in a 1394 serial bus;

FIGS. 28A to 28C are flowcharts showing the printing sequence in a host device;

DESCRIPTION OF THE PREFERRED EMBODIMENT

Figure 1:
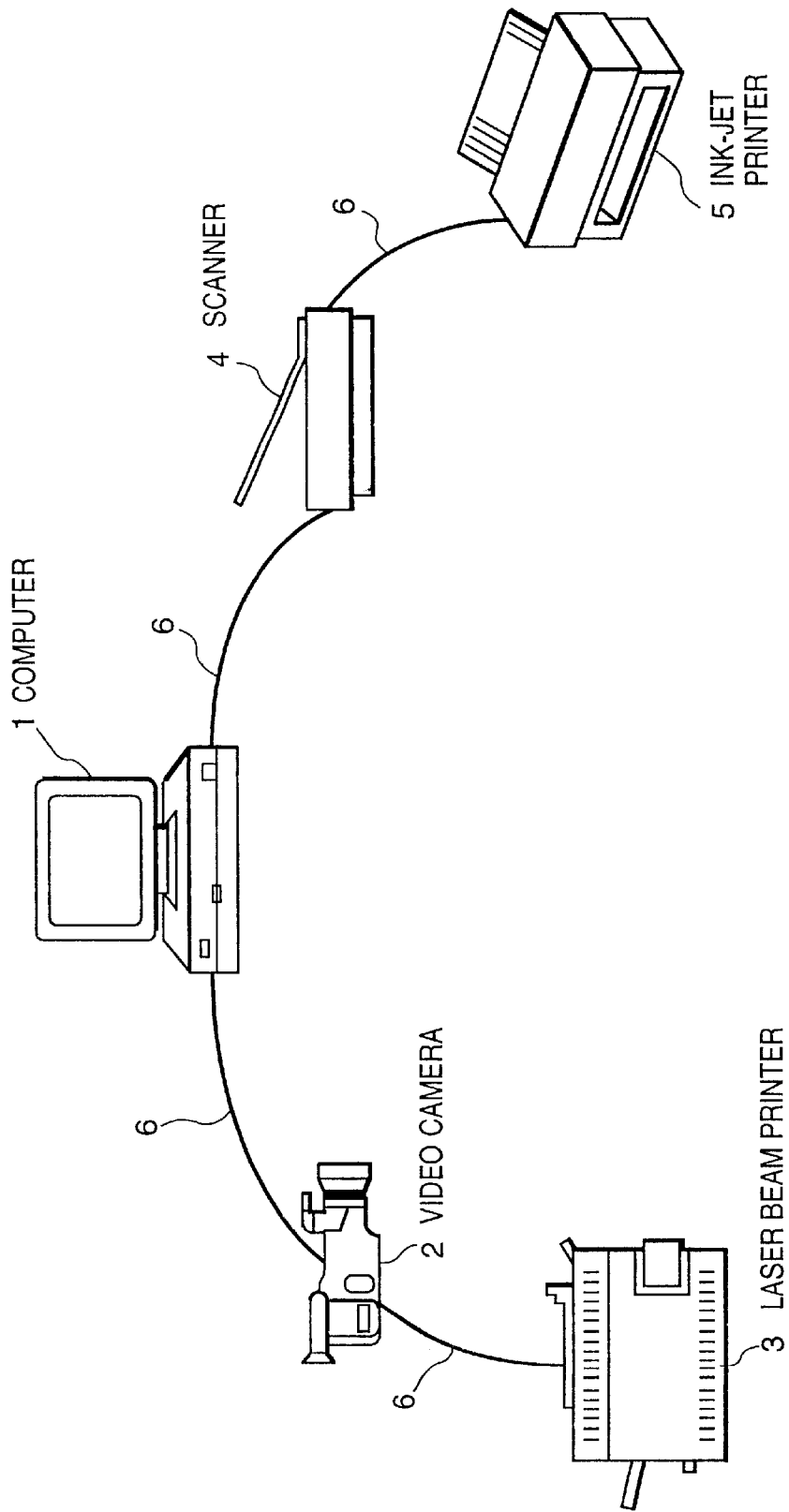
FIG. 1 is an explanatory view showing a general construction of a system to which the present invention is applied.

FIG. 1 shows an example of a network constructed by a 1394 serial bus. Each node around a workstation 1 (computer) is constituted by a video camera 2, a laser beam printer 3, a scanner 4, or an ink-jet printer 5. The nodes are connected by a cable 6 of the 1394 serial bus. In this case, data transfer from the workstation 1 to the printer 3 or 5, from the scanner 4 to the workstation 1, from the scanner 4 to the printer 3 or 5, from the video camera 2 to the workstation 1, and from the video camera 2 to the printer 3 or 5 can be assumed.

Outline of 1394 Serial Bus

With the appearance of general digital video cam recorder (VCR) and digital video disk (DVD) player, there is a need for transferring realtime and large amount data such as video data and audio data (hereinafter referred to as "AV data"). To transfer AV data in realtime to a personal computer (PC) or other digital devices, an interface capable of high-speed data transfer is required. The 1934 serial bus has been developed from the above purpose.

Figure 2:
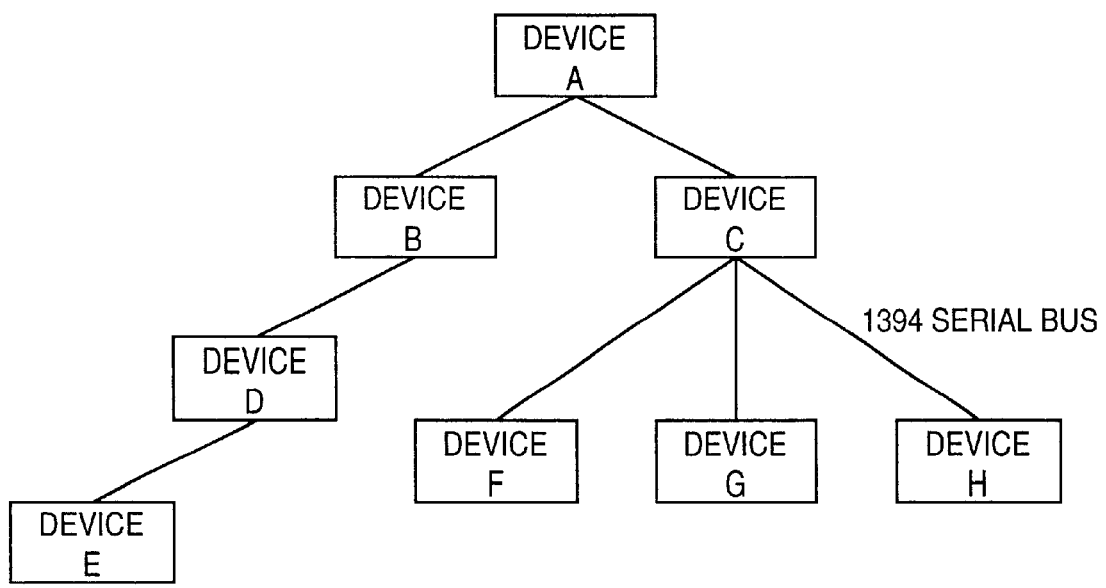
FIG. 2 is a block diagram showing an example of a network system constructed with an IEEE 1394 serial interface.

FIG. 2 shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VCR, a DVD player, a digital still camera, a storage device using a storage medium such as a hard disk or an optical disk, a monitor such as a CRT or an LCD, a tuner, an image scanner, a film scanner, a printer, a MODEM, and a terminal adapter (TA), a Set-Top-Box, a digital television, a conference camera, a digital video system and a complex machine of them.

The connection between the devices may be made by intermixing a daisy chain method and a node branching method, thus realizing high-freedom of connecting.

The respective devices have an ID, and they construct a network by identifying each ID within a range connected by the 1394 serial bus. For example, the devices, respectively, take a relaying role when connected in a daisy-chain with cables for the 1394 serial bus, thus constructing a network.

As the 1394 serial bus corresponds to Plug and Play function, it automatically recognizes a device connected to the cable, thus recognizes connection status. In the system as shown in FIG. 2, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as control signals, an isochronous transfer mode for transferring isochronous data such as realtime AV data are available. In data transfer, within each cycle (generally 125 ms/cycle), a cycle start packet (CSP) indicating the start of cycle is transferred, and then asynchronous and isochronous data are mixedly transferred such that the isochronous data transfer is transferred prior to the asynchronous data.

Figure 3:
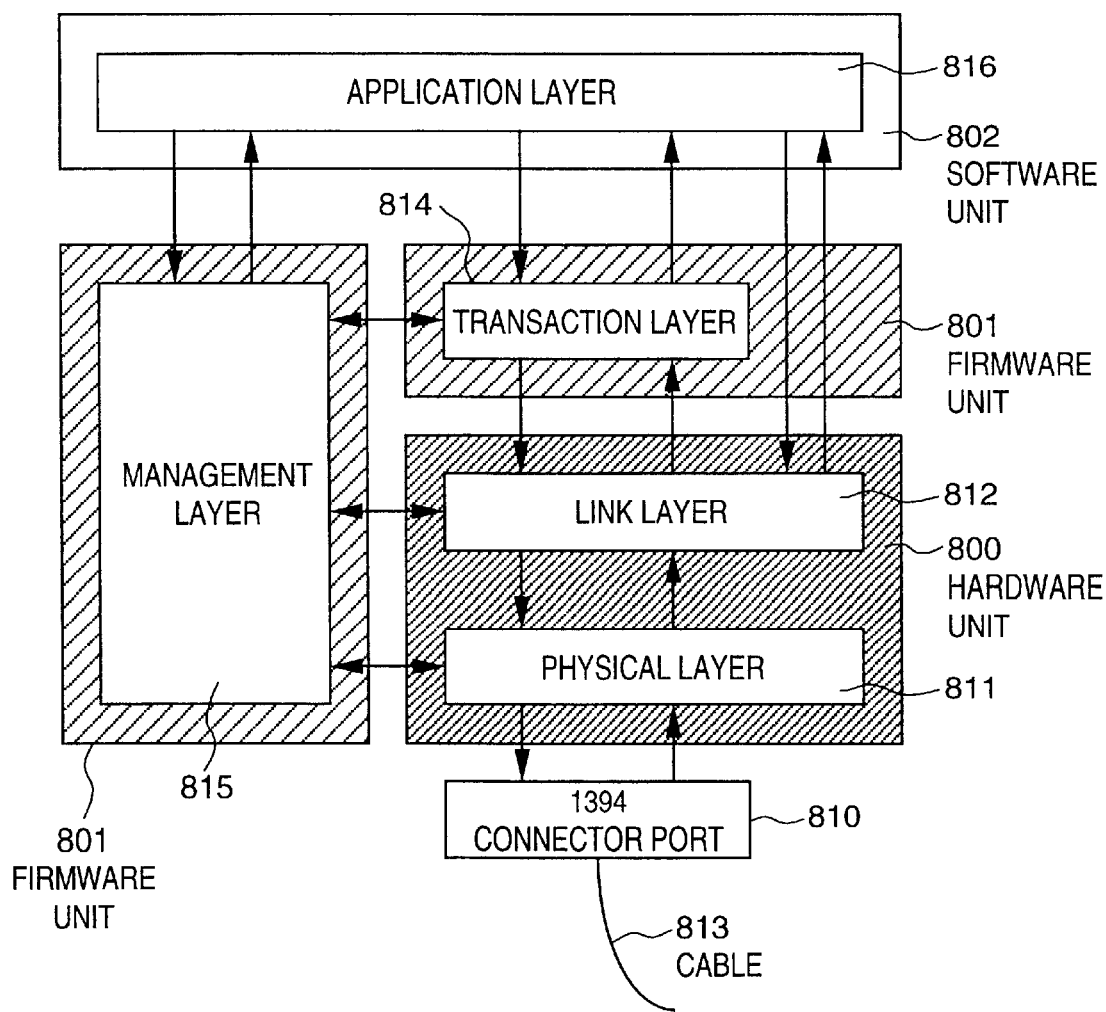
FIG. 3 is a block diagram showing the construction of the IEEE 1394 serial interface.

FIG. 3 shows the construction of the 1394 serial bus, as a layer structure. As shown in FIG. 3, a connector port 810 is connected to a connector at the end of a cable 813 for the 1394 serial bus. A physical layer 811 and a link layer 812 in a hardware unit 800 are positioned as upper layers with respect to the connector port 810. The hardware unit 800 comprises interface chips. The physical layer 811 performs coding, connection-related control and the like, and the link layer 812, packet transfer, cycle-time control and the like.

In a firmware unit 801, a transaction layer 814 manages data to be transferred (transaction data), and outputs commands Read, Write and Lock. A management layer 815 in the firmware unit 801 manages connection statuses and ID's of the respective devices connected to the 1394 serial bus, thus manages the network construction. The above hardware and firmware units substantially construct the 1394 serial bus.

In a software unit 802, an application layer 816, differs in software used by the system, and the data transfer protocol indicating how to transfer data on the interface is defined by a protocol such as a printer protocol or an AVC protocol.

Figure 4:
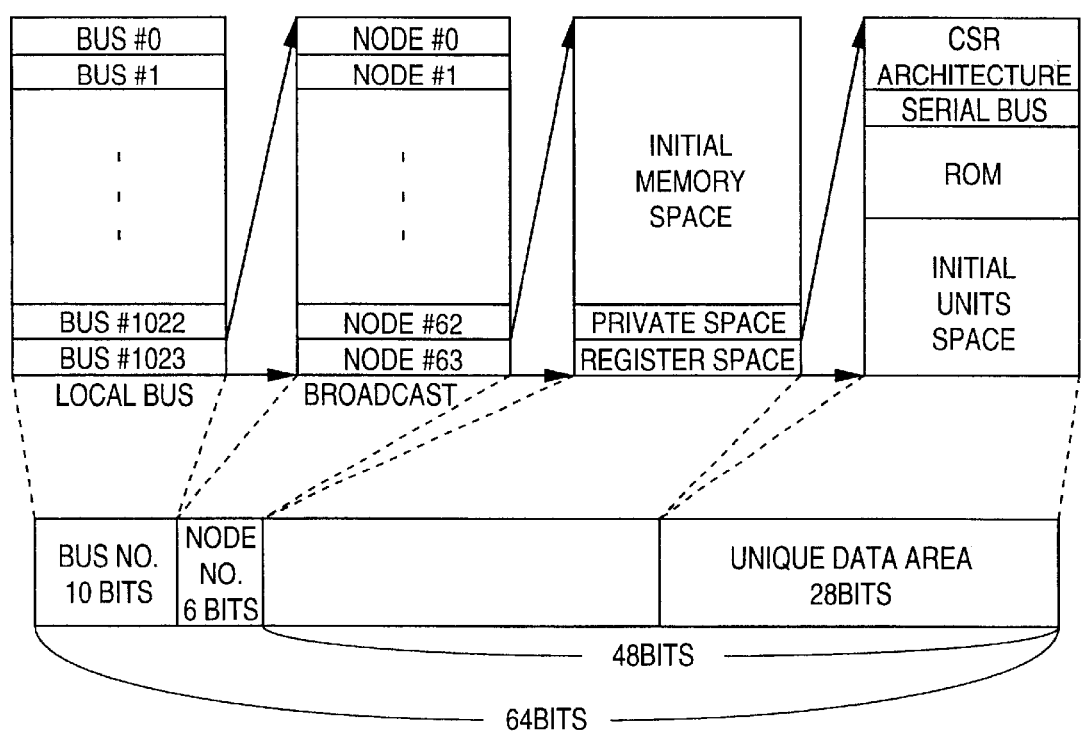
FIG. 4 is an explanatory view showing address space of the IEEE 1394 serial interface.

FIG. 4 shows address space of the 1394 serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating an node ID.

48-bit address used in the respective devices are divided into 20 bits and 28 bits, and utilized in the unit of 256 Mbytes. In the initial 20-bit address space, "0" to "0xFFFFD" is called a memory space; "0xFFFFE", a private space; "0xFFFFF", a register space. The private space is an address freely used in the device. The register space, holding information common to the devices connected with the bus, is used for communication among the respective devices.

In the register space, the initial 512 bytes are assigned to a register core (CSR core) as a core of a Command/Status Register (CSR) architecture; the next 512 bytes, to a register of the serial bus; the next 1024 bytes, to a configuration ROM; and the remaining bytes, to a register unique to the device in a unit space.

Generally, for the sake of simplification of bus system design for different node types, it is preferable that only the initial 2048 bytes are used for the nodes, and as a result, total 4096 bytes are used including the initial 2048 bytes for the CSR core, the register of the serial bus, the configuration ROM and the unit space.

The 1394 serial bus has the construction as described above. Next, the features of the 1394 serial bus will be described in more detail.

Electrical Specification of 1394 Serial Bus

Figure 5:
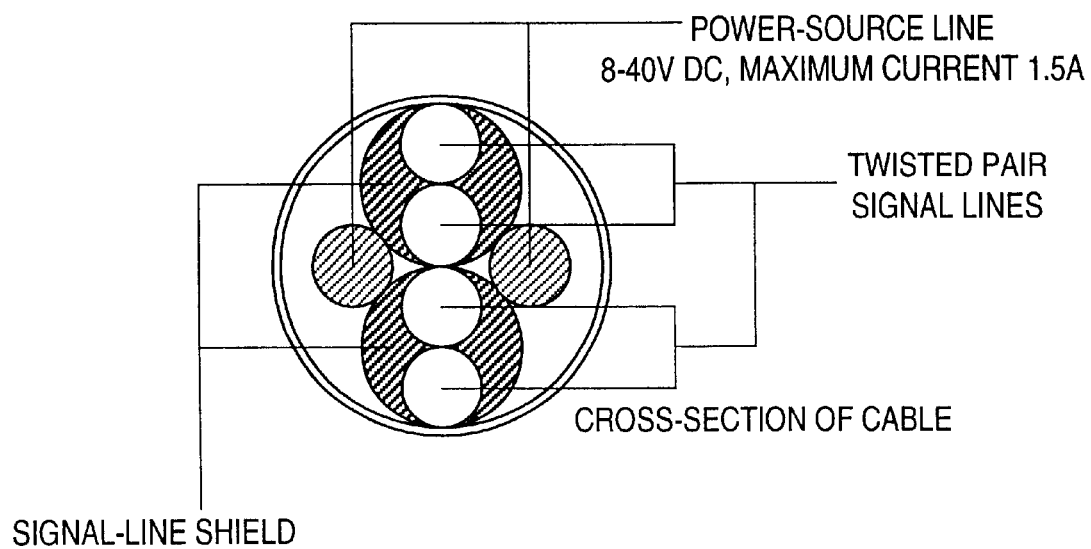
FIG. 5 is a cross-sectional view showing a cable for the IEEE 1394 serial interface.

FIG. 5 shows a cross-section of the cable of the 1394 serial bus. The 1394 serial cable comprises two sets of twisted pair signal lines and two power-source lines. This construction enables power supply to a device which lacks a power source, or a device where a voltage is degraded due to a failure or the like. The direct-current voltage supplied by the power-source lines is 8 to 40V; the current is maximum 1.5 A. Note that in the standards for so-called DV cable, four lines except the power-source line construct the cable.

DS-Link

Figure 6:
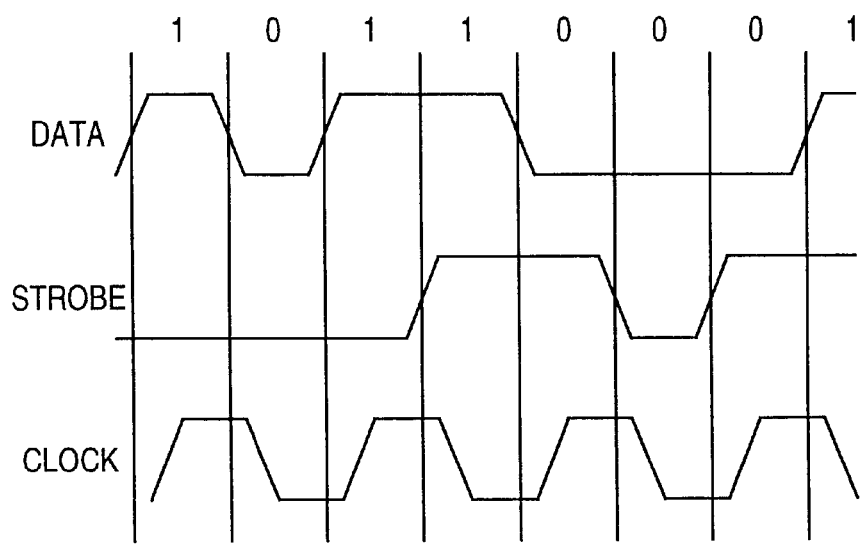
FIG. 6 is a timing chart explaining a Data/Strobe Link method.

FIG. 6 is a timing chart explaining a DS-Link (Data/Strobe-Link) method as a data transfer method.

The DS-Link method, appropriate for high-speed serial data communication, requires two sets of two signal lines. That is, one of the two sets of twisted-pair signal lines is used for sending a data signal, and the other one set of twisted-pair signal lines is used for sending a strobe signal. On the receiving side, an EXCLUSIVE-OR between the data signal and the strobe signal is obtained so as to generate a clock signal. In the DS-Link transfer, it is unnecessary to mix a clock signal into a data signal, therefore, transfer efficiency is higher than that in other serial-data transfer methods. Further, as a clock signal is generated from the data signal and the strobe signal, a phase locked loop (PLL) circuit can be omitted, which attains downsizing of the scale of a controller LSI. Further, in the DS-Link transfer, it is unnecessary to send information indicative of idle status when there is no data to be transferred, therefore, a transceiver of each device can be set in a sleep status, which reduces electric consumption.

Bus-Reset Sequence

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 810.

When the bus-reset signal is sent from one node, the physical layer 811 of the respective nodes receives the bus-reset signal, and at the same time, notifies the link layer 812 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 800 has detected network abnormality or the like. Further, the bus-reset sequence is also started by a direct instruction to the physical layer 811 such as host control by a protocol. As the bus-reset sequence is started, data transfer is suspended during the bus reset, and after the bus reset, the data transfer is restarted in the new network construction.

Node-ID Determination Sequence

After the bus reset, the respective nodes start to obtain a node ID so as to construct a new network construction. A general sequence from the bus reset to node-ID determination will be described with reference to the flowcharts of FIGS. 7 to 9.

Figure 7:
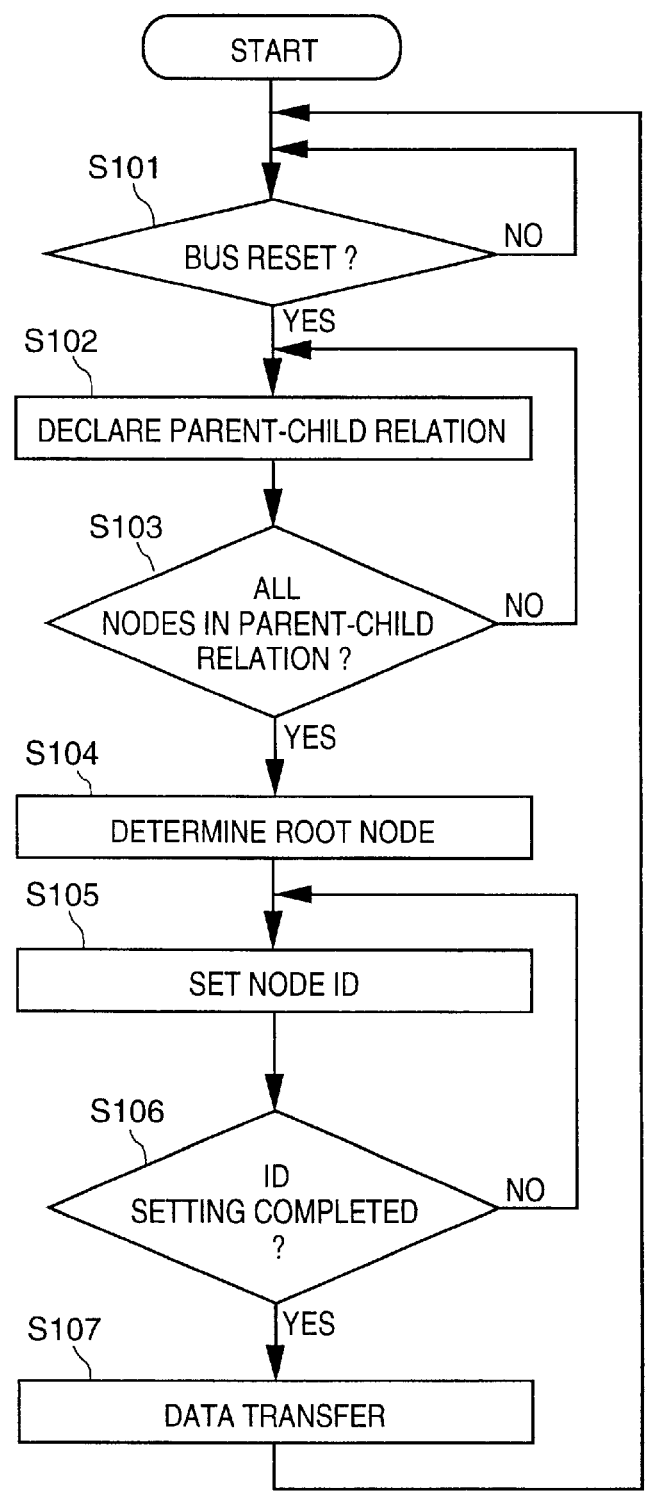
FIGS. 7 to 9 are flowcharts showing a procedure of network construction in the IEEE 1394 serial interface.

FIG. 7 is a flowchart showing a sequence from occurrence of bus-reset signal to node-ID determination and data transfer. At step S101, the respective nodes always monitor occurrence of bus-reset signal. When the bus-reset signal has occurred, the process proceeds to step S102, at which to obtain a new network construction in a state where the network construction has been reset, parent-child relation is declared between nodes connected to each other. Step S102 is repeated until it is determined at step S103 that the parent-child relation has been determined among all the nodes.

As the parent-child relation has been determined, the process proceeds to step S104, at which one "root (node)" is determined. At step S105, node-ID setting is performed so as to provide an ID to the respective nodes. The node-ID setting is made in a predetermined order of the nodes. Step S105 is repeated until it is determined at step S106 that the ID's have been given to all the nodes.

As the node-ID setting has been completed, since the new network construction has been recognized by all the nodes, data transfer among the nodes is possible. At step S107, data transfer is started, and the process returns to step S101, at which occurrence of bus-reset signal is monitored again.

Figure 8:
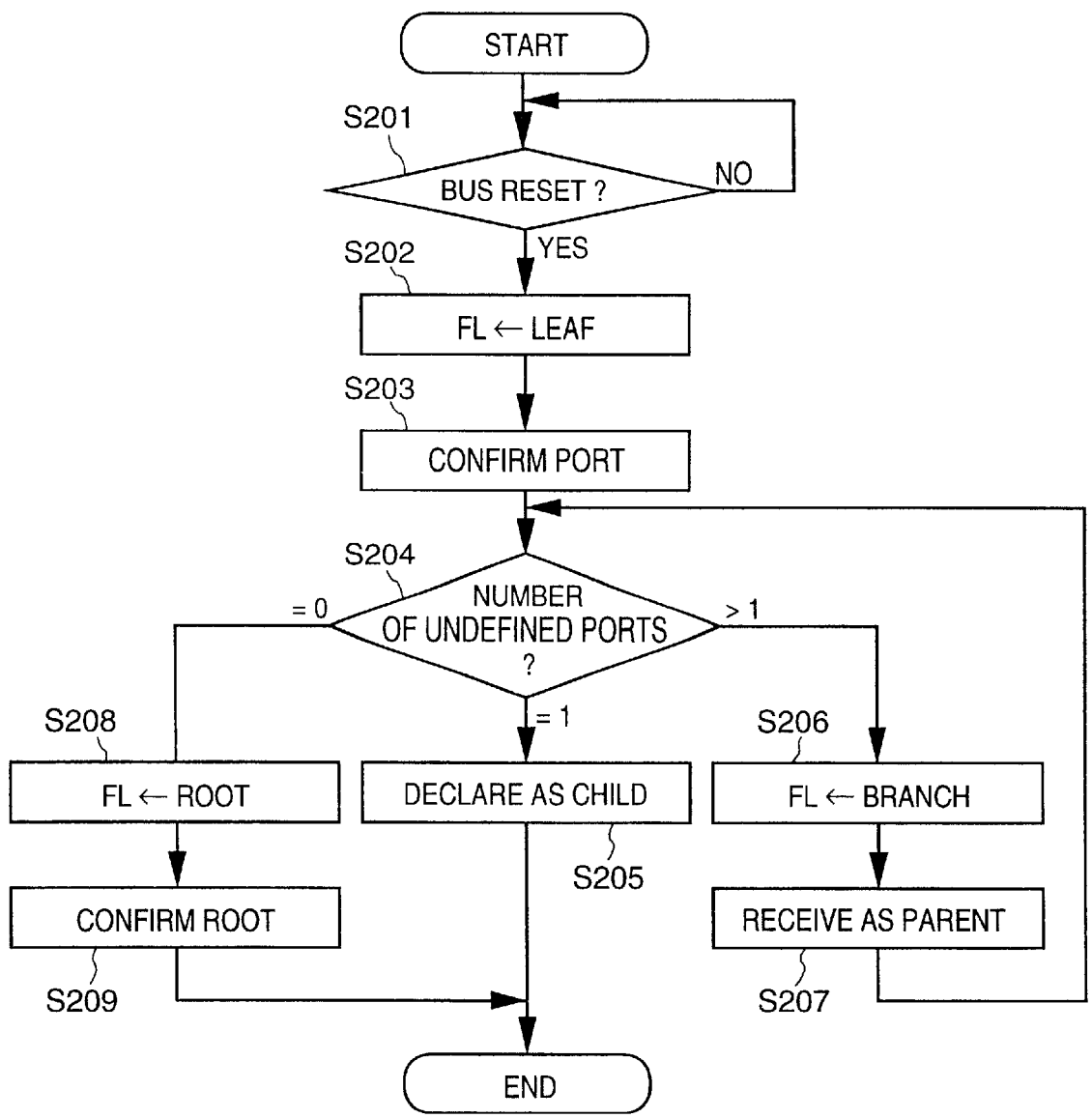
Figure 9:
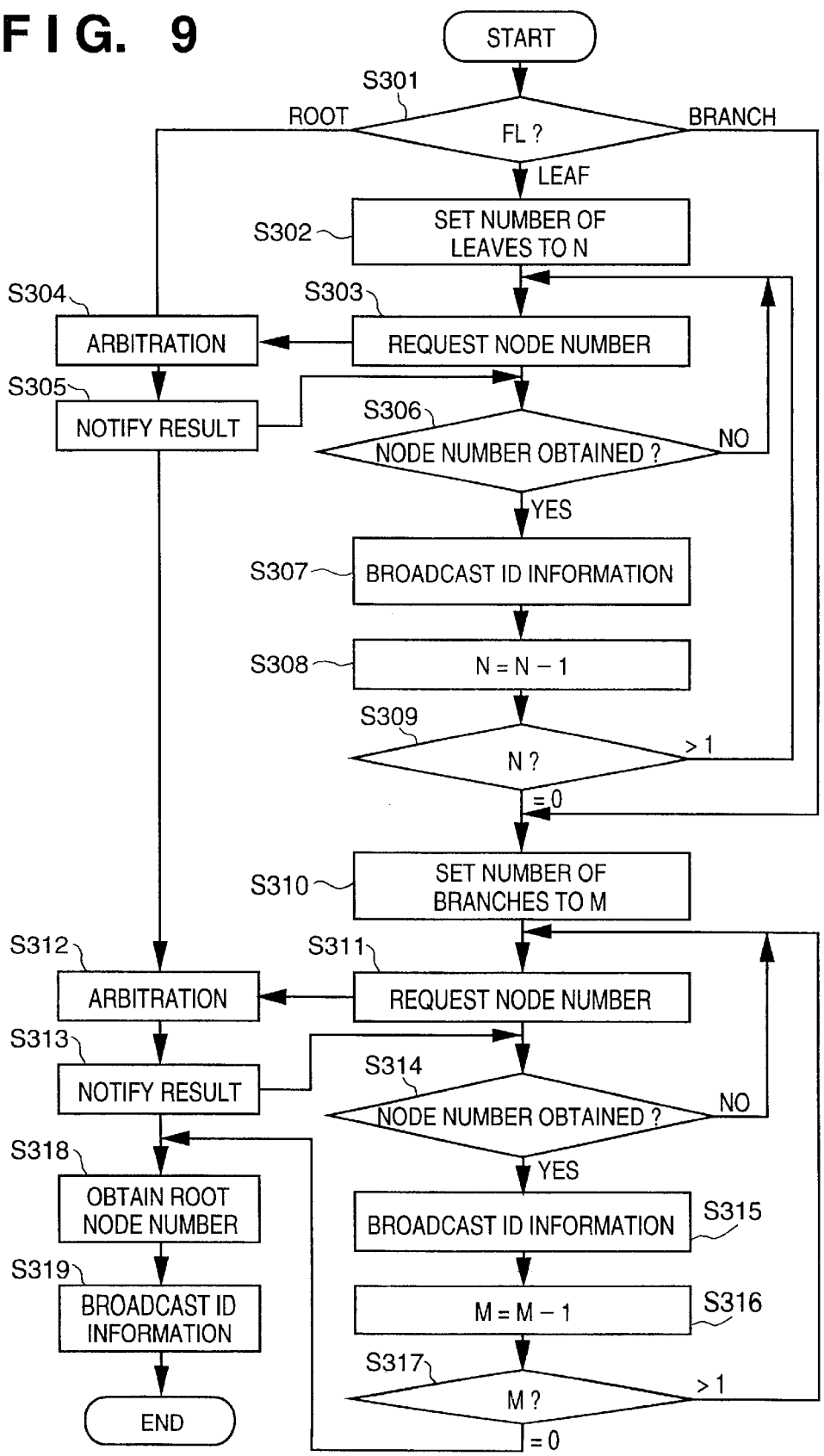

FIG. 8 is a flowchart showing the sequence from the monitoring of bus-reset signal (S101) to the root determination (S104) in detail. FIG. 9 is a flowchart showing the node-ID setting (S105 and S106) in detail.

In FIG. 8, at step S201, the occurrence of bus-reset signal is monitored, and as the bus-reset signal has occurred, the network construction is reset. Next, at step S202, as a first step for re-recognizing the reset network construction, the respective devices reset its flag FL with data indicative of "leaf (node)". At step S203, the respective devices examine the number of ports, i.e., the number of other nodes connected to them. At step S204, based on the result of examination at step S203, the devices examine the number of undefined (i.e., parent-child relation has not been determined) ports. The number of undefined ports is equal to that of the ports immediately after the bus reset, however, with the progress of determination of parent-child relation, the number of undefined ports detected at step S204 decreases.

Only actual leaf(ves) can declare parent-child relation immediately after the bus reset. Whether or not the node is a leaf is detected from the number of ports examined at step S203; i.e., if the number of ports is "1", the node is a leaf. The leaf declares that "this node is a child, and the connected node is a parent" at step S205, then terminates the operation.

On the other hand, a node that detected at step S203 that the number of ports is "two or more" is a "branch". Immediately after the bus reset, as "undefined ports >1" holds, the process proceeds to step S206, at which the flag FL is set with data indicative of "branch", then declaration of parent-child relation from another node is waited at step S207. When the parent-child relation is declared from another node, the process returns to step S204 at which the branch examines the number of undefined ports. If the number of undefined ports is "1", the branch can declare at step S205 that "this node is a child, and the connected node is a parent" to the node connected to the remaining port. If the number of undefined ports is still "two or more", the branch waits for declaration of parent-child relation from another node at step S207.

When any one of the branches (or exceptionally leaf(ves) which delayed declaring a child) detects that the number of undefined ports is "0", the parent-child declaration of the overall network has been completed. The only node that has "0" undefined port, i.e., the parent of all the nodes, sets the flag FL with data indicative of a "root" at step S208. Then at step S209, the node is recognized as a root.

In this manner, the procedure from the bus reset to the parent-child declaration among all the nodes in the network ends.

Next, a procedure of providing each node with an ID will be described. First, the ID setting is performed at the leaves. Then, ID's are set in numerical order (from node number: 0) from leaves® branches® root.

In FIG. 9, at step S301, the process splits in accordance with node type, i.e., leaf, branch or root, based on the data set at the flags FL.

In case of leaf, at step S302, the number of leaves (natural number) in the network is set to a variable N. At step S303, the respective leaves request a node number to the root. If a plurality of requests have been made, the root performs arbitration at step S304, and provides a node number to one node at step S305, while notifies the other nodes of the result of acquisition of node-number indicating that the node number has been failed.

A leaf that has not obtained a node number (NO at step S306) repeats the request for node number at step S303. On the other hand, a leaf that has obtained a node number notifies all the nodes of the obtained node number by broadcasting ID information including the node number. As the broadcasting of the ID information has been completed, the variable N indicative of the number of leaves is decremented at step S308. Then, from the determination at step S309, the procedure from step S303 to step S308 is repeated until the variable N becomes "0" in the determination at step S309. When ID information on all the leaves have been broadcasted, the process proceeds to step S310, for setting ID's of branches.

The ID setting for branches is performed substantially similar to the ID setting for the leaves. First, at step S310, the number of branches (natural number) is set to a variable M. At step S311, the respective branches request the root for a node number. In response to the requests, the root performs arbitration at step S312, and provides a node number, subsequent to the last leaf node number, to a branch at step S313, while notifies the other branches of the result of acquisition of node-number indicating that the node number has been failed.

A branch that has not obtained a node number (NO at step S314) repeats the request for node number at step S315. On the other hand, a branch that has obtained a node number notifies all the nodes of the obtained node number by broadcasting ID information including the node number. As the broadcasting of the ID information has been completed, the variable M indicative of the number of branches is decremented at step S316. Then, from the determination at step S317, the procedure from step S311 to step S316 is repeated until the variable M becomes "0" in the determination at step S317. When ID information on all the leaves have been broadcasted, the process proceeds to step S318, for setting the ID of the root.

At this time, it is only the root that has not obtained a node ID. At step S318, the root obtains the smallest number that has not been provided to any other node as the node ID of the root, and at step S319, broadcasts ID information on the root.

As described above, the procedure until the node ID's for all the nodes have been set ends. Next, the sequence of node ID determination will be described with reference to the network example shown in FIG. 10.

Figure 10:
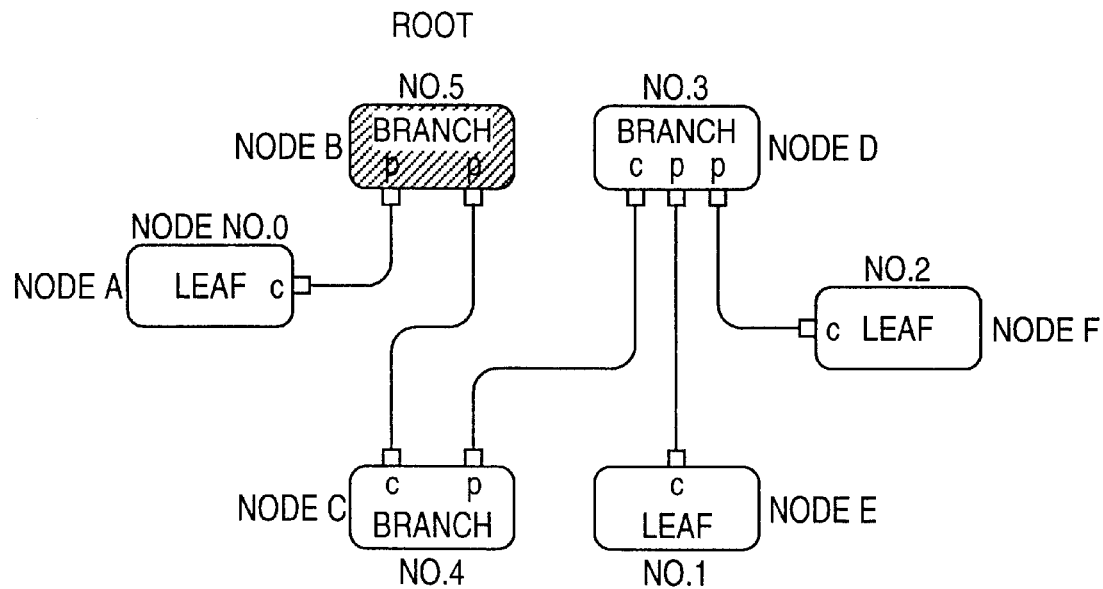
FIG. 10 is a block diagram showing an example of the network.

In the network in FIG. 10, a node B as a root is directly connected to its lower nodes A and C; the node C is directly connected to its lower node D; and the node D is directly connected to its lower nodes E and F. The procedure of determining this hierarchical structure, the root node and the node ID's will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 10, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leave node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s), from the node that first received declaration of parent-child relation from the leaf. In FIG. 10, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 10 is constructed. The node B, that has finally become the parent at all the ports, is determined as a root. Note that a network has only one root. In a case where the node B that has received declaration of parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root has been determined, the sequence of determining the respective node ID's is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaves. In numerical order, node number=0, 1, 2, . . . is assigned. Then, by the broadcasting of ID information, it is recognized that the node number has been assigned.

As all the leaves have obtained a node number, node numbers are assigned to the branches. Similar to the assignment of node numbers to the leaves, ID information is broadcasted from the branch that received a node number, and finally, the root broadcasts its ID information. Accordingly, the root always has the larger node number.

Thus, as the ID setting of the overall hierarchical structure has been completed and the network has been constructed, then the bus initialization is completed.

Control Information for Node Management

The CSR core as shown in FIG. 4 exists on the register as a basic function of the CSR architecture for node management. FIG. 11 shows the positions and functions of the registers. In FIG. 11, the offset is a relative position from "0xFFFFF0000000".

In the CSR architecture, the register for the serial bus is arranged from "0xFFFFF0000200". FIG. 12 shows the positions and functions of the registers.

Further, information on node resources of the serial bus is arranged from "0xFFFFF0000800". FIG. 13 shows the positions and functions of the registers.

The CSR architecture has a configuration ROM for representing functions of the respective nodes. The configuration ROM has a minimum format and a general format, arranged from "0xFFFFF0000400". As shown in FIG. 14, the minimum format configuration ROM merely shows a vendor ID which is a unique numerical value represented by 24 bits.

As shown in FIG. 15, the general format configuration ROM has information on a node. In this case, the vendor ID in this format is included in a "root_directory". Further, "bus_info_block" and "root&unit_leaves" include unique device number including the vendor ID, represented by 64 bits. The device number is used after network reconstruction by bus reset operation, to continue recognition of the node.

Serial Bus Management

As shown in FIG. 3, the protocol of the 1394 serial bus comprises a physical layer 811, a link layer 812 and a transaction layer 814. This provides, as the serial bus management, a basic function for node management and bus resource management, based on the CSR architecture.

Only one node which performs bus management (hereinafter referred to as "bus management node") exists on the same bus, and provides the other nodes on the serial bus with management function which includes cycle master control, performance optimization, power source management, transmission speed management, construction management and the like.

The bus management function briefly divides into a bus manager, an isochronous resource manager and a node control function. The node control is a management function which enables communication among the nodes in the physical layer 811, the link layer 812, the link layer 812, the transaction layer 814 and an application program by the CSR. The isochronous resource manager, which is a management function necessary for isochronous-type data transfer on the serial bus, manages assignment of transfer bandwidth and channel number to isochronous data. For this management, after bus initialization, the bus management node is dynamically selected from nodes having the isochronous resource manager function.

Further, in a construction without a bus management node on the bus, a node having the isochronous resource manager function performs a part of the bus management such as the power source management and cycle master control. Further, the bus management is a management function as service to provide a bus control interface to an application program. The control interface uses a serial-bus control request (SB_CONTROL.request), a serial-bus event control confirmation (SB_CONTROL.confirmation) and a serial-bus event indication (SB_EVENT.indication).

Figure 27:
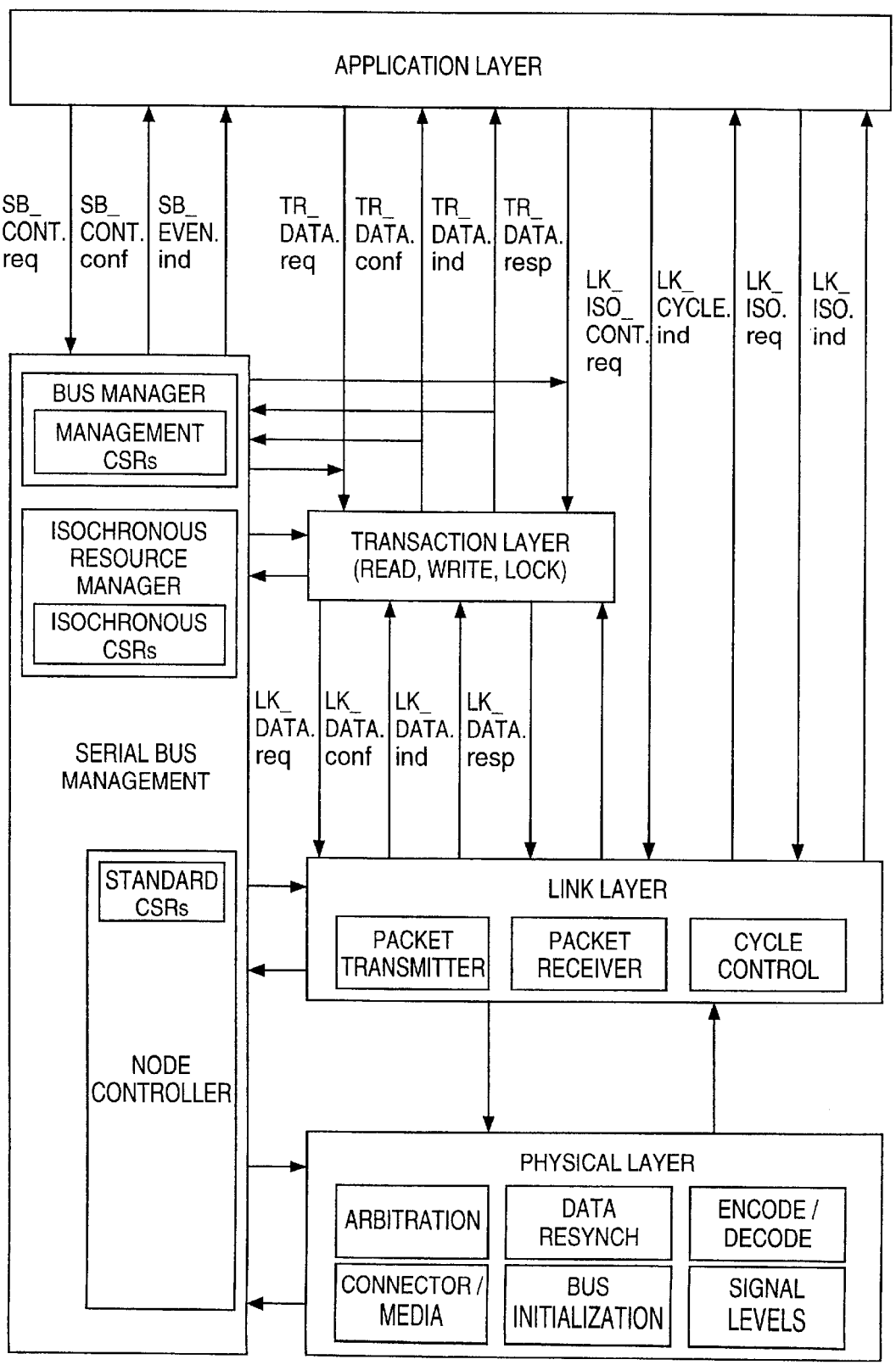
FIG. 27 is a view showing the protocol architecture of the IEEE 1394 interface.

The serial-bus control request is shown in FIG. 27 as SB_CONTROL.req, and used when an application program requires the bus management node to perform bus reset, bus initialization, representation of bus-status information, and the like.

The serial-bus event control confirmation is, shown in FIG. 27 as SB_CONTROL.conf, the result of the serial-bus control request, and is notified from the bus management node to the application for confirmation.

The serial-bus event control confirmation is, shown in FIG. 27 as SB_EVENT.ind, made as notification of an asynchronously-caused event from the bus management node to the application.

Data Transfer Protocol

The data transfer by using the 1394 serial bus simultaneously sends isochronous data (isochronous packet) which must be periodically transmitted, and asynchronous data (asynchronous packet) which can be transmitted/received at arbitrary timing, further, ensures real-time transmission of isochronous data. In the data transfer, a bus use right is requested prior to transfer, and bus arbitration is performed to obtain bus use permission.

In the asynchronous transfer, a transmitting node ID and a receiving node ID are sent with transfer data as packet data. The receiving node confirms the receiving node ID, i.e., its node ID, receives the packet, and returns an acknowledge signal to the transmitting node. Thus, one transaction is completed.

In the isochronous transfer, a transmitting node requires an isochronous channel with a transmission speed, and a channel ID is sent with transfer data as packet data. A receiving node confirms a desired channel ID and receives the data packet. The necessary channel number and transmission speed are determined by the application layer 816.

These transfer protocols are defined by the physical layer 811, the link layer 812 and the transaction layer 813. The physical layer 811 performs physical and electrical interface with the bus, automatic recognition of node connection, bus arbitration for a bus use right among nodes, and the like. The link layer 812 performs addressing, data checking, packet transmission/reception and cycle control for isochronous transfer. The transaction layer 814 performs processing relating to asynchronous data. Hereinbelow, the processings in the respective layers will be described.

Physical Layer

The bus arbitration in the physical layer 811 will be described.

The 1394 serial bus always performs arbitration of bus use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 16:
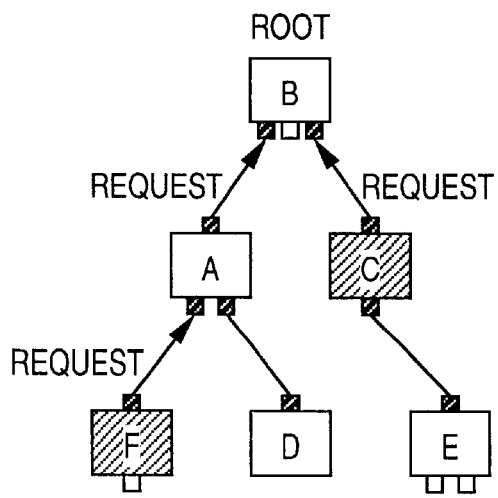
FIGS. 16 and 17 are block diagrams explaining bus arbitration.
Figure 17:
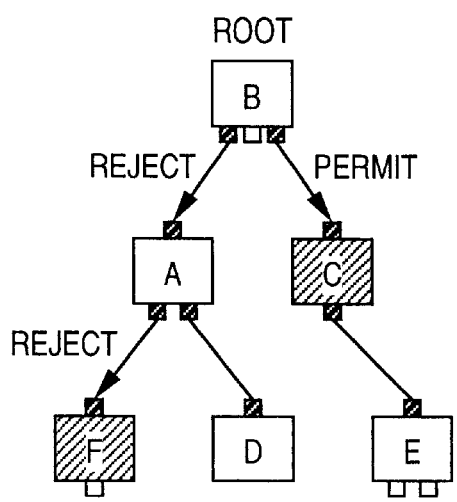

FIGS. 16 and 17 are block diagrams explaining the bus arbitration. FIG. 16 shows operation to request a bus use right; and FIG. 17, operation to allow to use the bus.

When the bus arbitration is started, a single or plurality of nodes respectively request a bus use right to use the bus to its parent node. In FIG. 16, the nodes C and F request a bus use right. The parent node (node A in FIG. 16) that has received the request relays the request by further requesting a bus use right to its parent node. The request is forwarded to a root (node B in FIG. 16) that finally performs arbitration.

The root that has received the request for bus use right determines a node to be provided with the bus use right. This arbitration can be performed only by the root. The node that dominated in the arbitration is provided with the bus use right. FIG. 17 shows that the node C has obtained the bus use right and the request from the node F has been rejected.

The root sends a DP (data prefix) packet to nodes lost in the bus arbitration so as to notify that their requests have been rejected. The requests from those nodes are held by the next bus arbitration.

Thus, the node that obtained the bus use permission starts data transfer.

Figure 18:
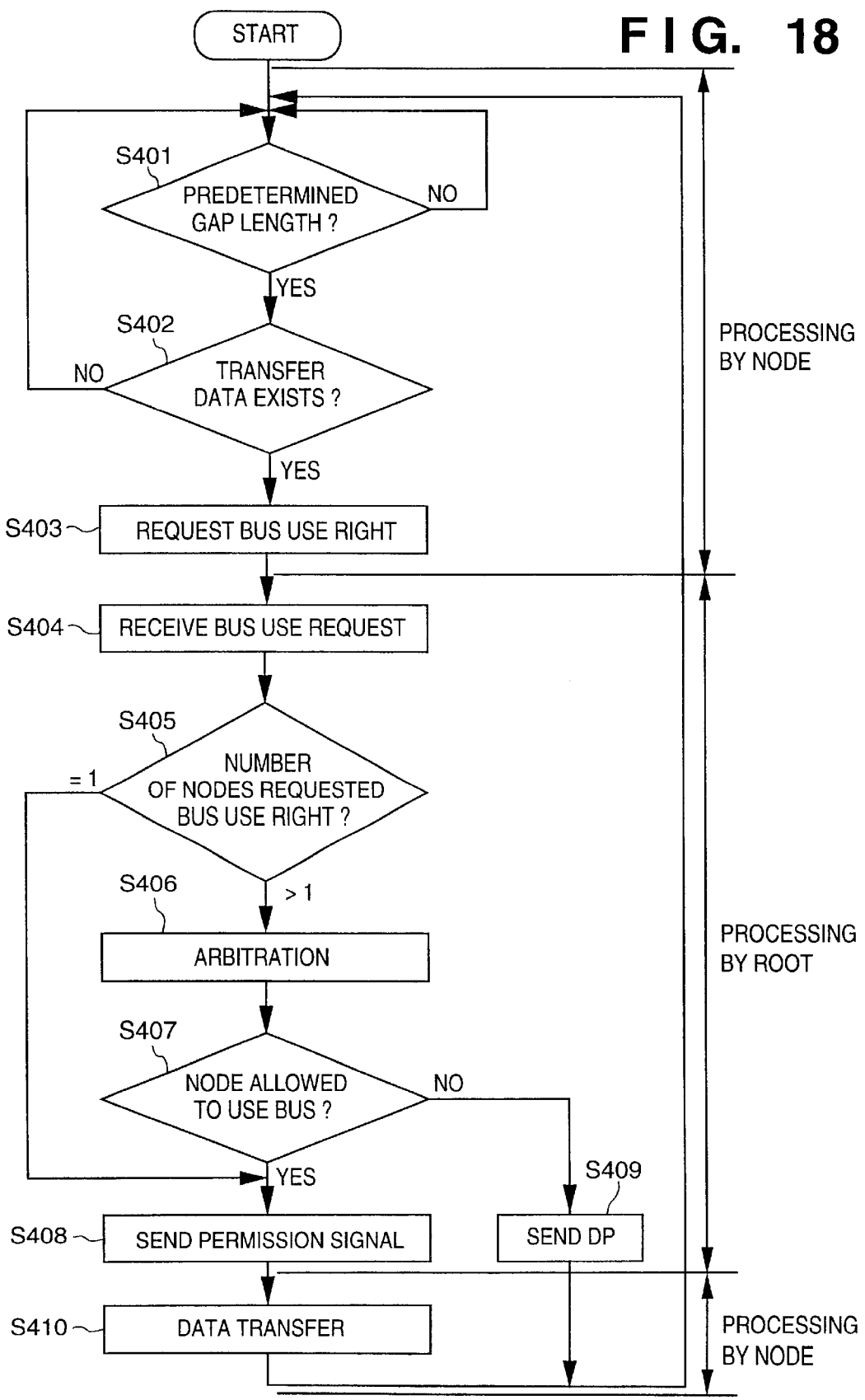
FIG. 18 is a flowchart showing a procedure of the bus arbitration.

The sequence of the bus arbitration will be described with reference to the flowchart of FIG. 18.

To start data transfer by a node, the bus must be in idle status. To confirm that data transfer has been completed and the bus is currently in idle status, each node detects a gap length of a predetermined idle period (e.g., sub-action gap) set in each transfer mode, and it determines whether or not the bus is currently in idle status based on the detection result.

At step S401, the node determines whether or not a predetermined gap length corresponding to asynchronous data or isochronous data to be transferred has been detected. So far as the node has not detected the predetermined gap length, it cannot request a bus use right to start data transfer, accordingly, the node waits until the predetermined gap length has been detected.

When the predetermined gap length has been detected at step S401, the node determines whether or not there is data to be transferred at step S402. If YES, it issues a signal requesting a bus use right to the root at step S403. As shown in FIG. 16, this signal requesting the bus use right is relayed by the respective devices in the network, and forwarded to the root. If it is determined at step S402 that there is no data to be transferred, the process returns to step S401.

At step S404, if the root has received a single or plurality of request signals for the bus use right, it examines the number of nodes requesting the bus use right at step S405. From the determination at step S405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root branches at step S407 into processing for the node dominated in the arbitration at step S406, and processing for the other nodes lost in the arbitration. In a case where there is one node that requested the bus use right, or one node has dominated in the arbitration, the node is provided with an permission signal indicative of bus use permission at step S408. The node starts data (packet) transfer immediately after it receives the permission signal (step S410). On the other hand, the nodes lost in the arbitration receive a DP (data prefix) packet indicative of rejection of the bus use request at step S409. The processing for the node that received the DP packet returns to step S401 to request a bus use right again. Also, the processing for the node that completed data transfer at step S410 returns to step S401.

Transaction Layer

The transaction layer includes a read transaction, a write transaction and a lock transaction.

In a read transaction, an initiator (requiring node) reads data from a specific address in the memory of a target (response node). In a write transaction, the initiator writes data into a specific address of the memory of the target. In a lock transaction, the initiator transfers reference data and update data to the target. The reference data is combined with data of the address of the target, into a designation address to specify a specific address of the target. Data at the designation address is updated by the update data.

Figure 19:
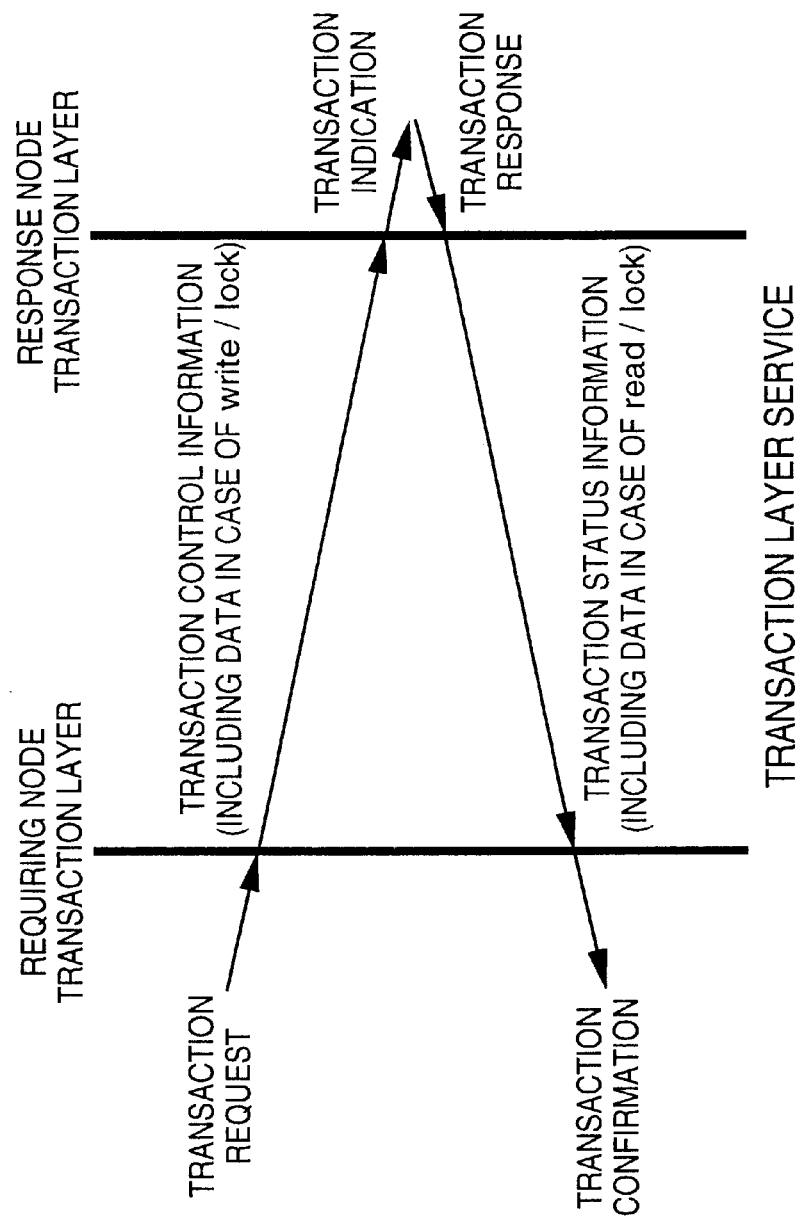
FIG. 19 is a timing chart showing a request-response protocol with read, write and lock commands, based on the CSR architecture in a transaction layer.

FIG. 19 shows a request-response protocol with read, write and lock commands, based on the CSR architecture in the transaction layer. In FIG. 19, the request, notification, response and confirmation are service units in the transaction layer 814.

A transaction request (TR_DATA.request) is packet transfer to a response node; a transaction indication (TR-DATA.indication) is notification of arrival of the request to the response node; a transaction response (TR_DATA.response) is transmission of acknowledgment; and a transaction confirmation (TR_DATA.confirmation) is reception of acknowledgment.

Link Layer

Figure 20:
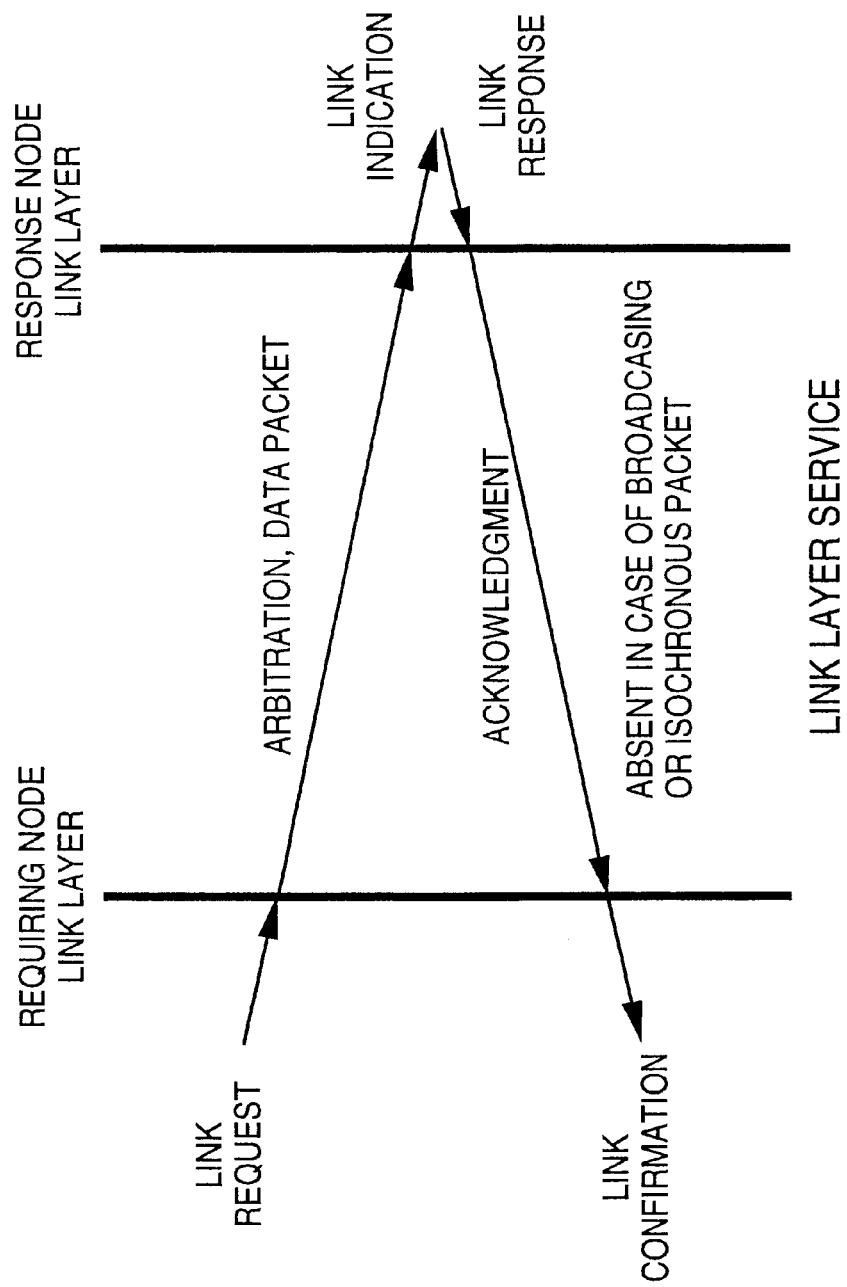
FIG. 20 is a timing chart showing services in a link layer.

FIG. 20 shows services in the link layer 812. The services are service units of a link request (LK_DATA.request) to require packet transfer from the response node, a link indication (LK_DATA.indication) indicating packet reception to the response node, a link response (LK_DATA.response) as acknowledgment transmitted from the response node, a link confirmation (LK_DATA.confirmation) as confirmation of the acknowledgment transmitted from the response node. One packet transfer process is called a sub-action including an asynchronous sub-action and an isochronous sub-action. Hereinbelow, the respective operations of the sub-actions will be described.

Asynchronous Sub-Action

The asynchronous sub-action is asynchronous data transfer.

Figure 21:
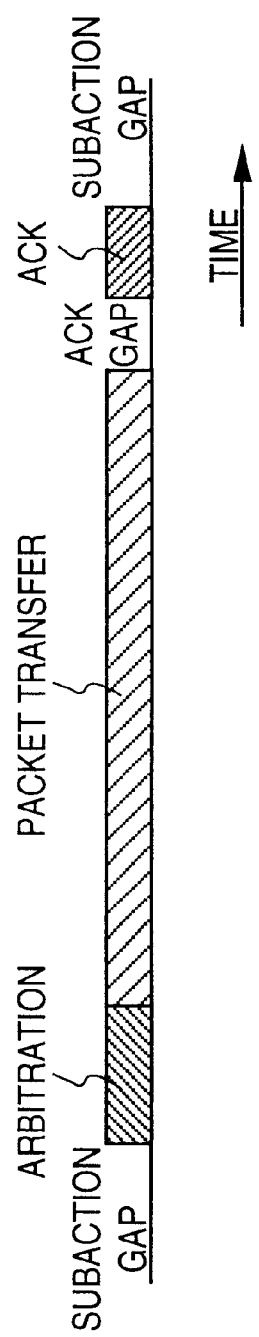
FIG. 21 is a timing chart showing transitional statuses in asynchronous data transfer.

FIG. 21 shows transition in the asynchronous transfer. In FIG. 21, the first sub-action gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 22:
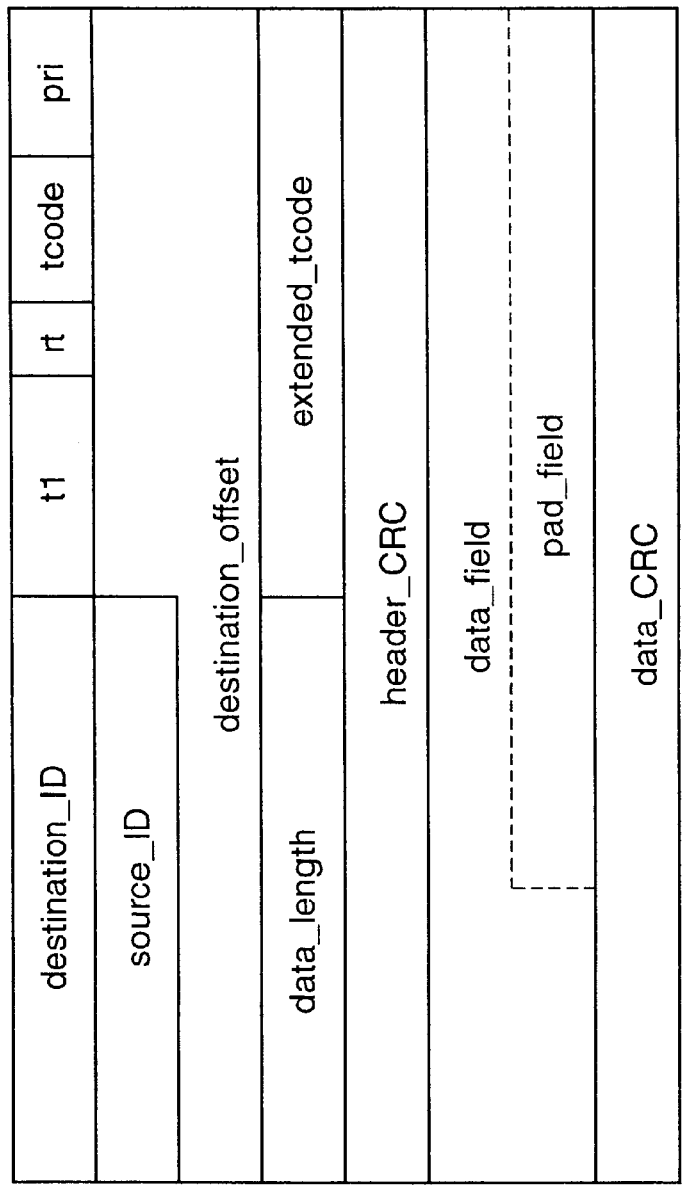
FIG. 22 is a diagram showing a packet format for the asynchronous transfer.

FIG. 22 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

Isochronous Sub-action

Isochronous transfer, which can be regarded as the greatest feature of the 1394 serial bus is appropriate to multimedia data transfer which requires realtime transfer of, especially, AV data.

Further, the asynchronous transfer is one-to-one transfer, whereas the isochronous transfer is broadcasting transfer from one sender node to all the other nodes.

Figure 23:
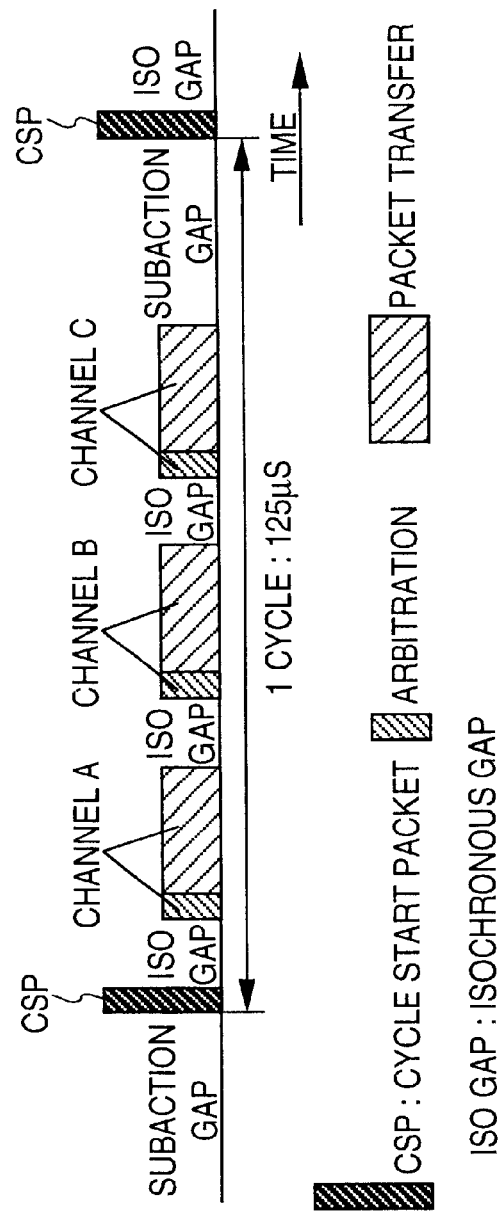
FIG. 23 is a timing chart showing transitional statuses in isochronous data transfer.

FIG. 23 shows transition in the isochronous transfer. The isochronous transfer is executed on the bus in a predetermined cycle, called "isochronous cycle". The period of the isochronous cycle is 125 ms. A cycle start packet (CSP) indicates the start of the isochronous cycle for synchronizing the operations of the respective nodes. When data transfer in a cycle has been completed and a predetermined idle period (sub-action gap) has elapsed, a node which is called "cycle master" sends the CSP indicative of the start of the next cycle. That is, this interval between the issuance of CSP's is 125 ms.

As channel A, channel B and channel C in FIG. 23, the respective packets are provided with a channel ID, so that plural types of packets can be independently transferred within one isochronous cycle. This enables substantially-realtime transfer among the plural nodes. The receiver node can receive only data with a predetermined channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code ACK used as a response in the asynchronous transfer is not used in the isochronous transfer.

Further, an isochronous gap (iso gap) in FIG. 23 represents an idle period necessary for confirming prior to isochronous transfer that the bus is in idle status. If the predetermined idle period has elapsed, bus arbitration is performed with respect to node(s) desiring isochronous transfer.

Figure 24:
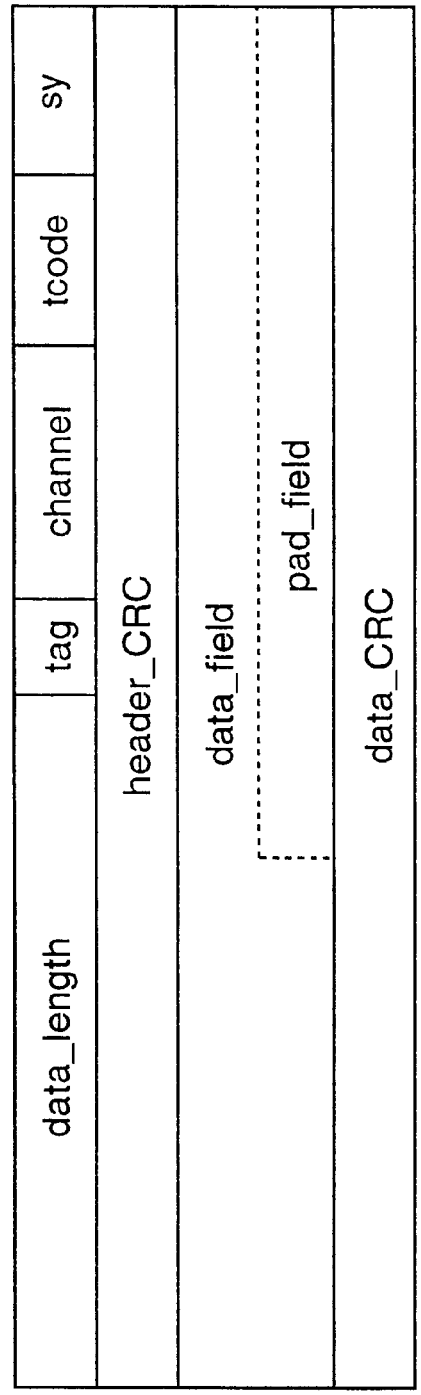
FIG. 24 is a diagram showing a packet format for the isochronous transfer.

FIG. 24 shows a packet format for isochronous transfer. Various packets divided into channels respectively have a data field, a data CRC field for error correction and a header field containing information such as a transfer-data length, a channel No., various codes and error-correction header CRC as shown in FIG. 25.

Bus Cycle

Figure 26:
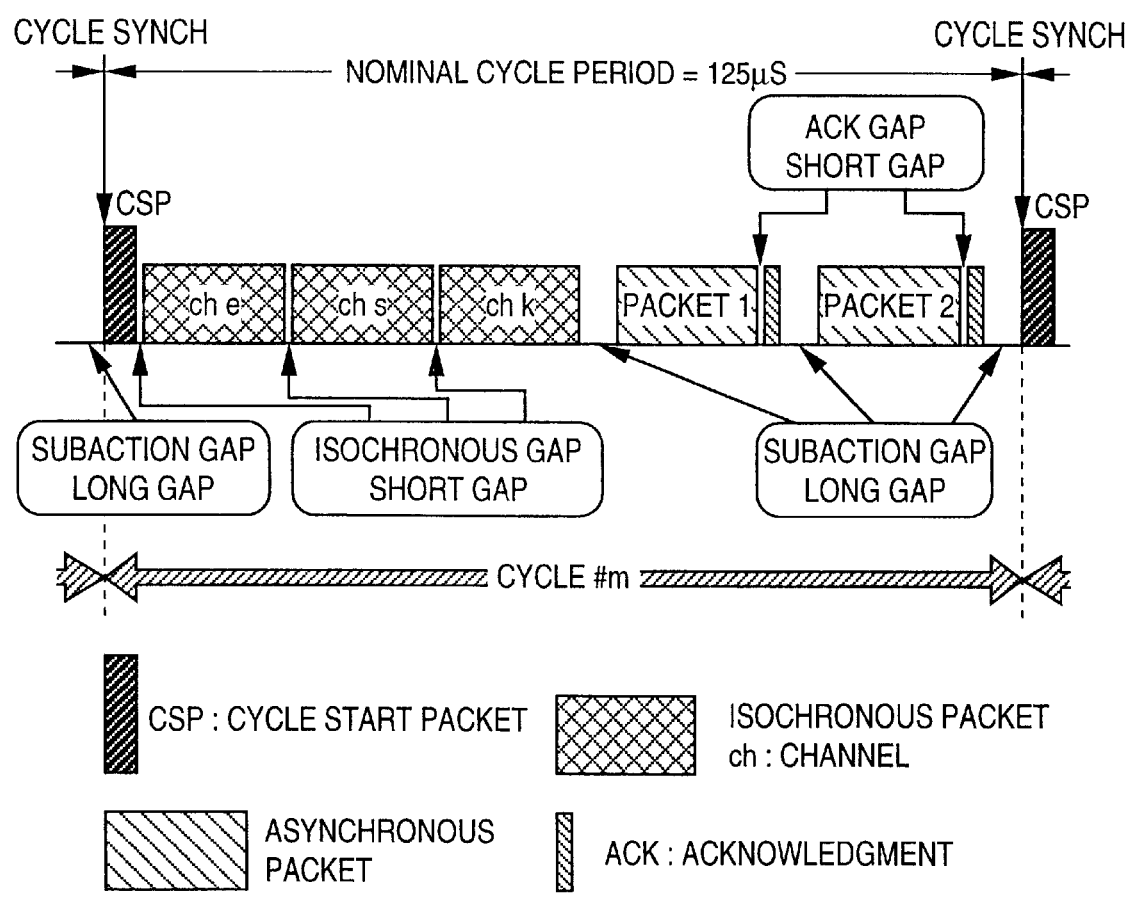
FIG. 26 is a timing chart showing transitional statuses in data transfer on the bus when the isochronous transfer and asynchronous transfer are mixedly performed.

In practice, both isochronous transfer and asynchronous transfer can be mixedly performed on the 1394 serial bus. FIG. 26 shows transition in the isochronous transfer and asynchronous transfer mixedly performed on the 1394 serial bus.

The isochronous transfer is performed prior to the asynchronous transfer because after the CSP, the isochronous transfer can be started with a gap (isochronous gap) shorter than the idle period necessary for starting the asynchronous transfer. Accordingly, the isochronous transfer has priority over the asynchronous transfer.

In the typical bus cycle as shown in FIG. 26, upon starting the cycle #m, a CSP is transferred from the cycle master to the respective nodes. The operations of the respective nodes are synchronized by this CSP, and node(s) that waits for a predetermined idle period (isochronous gap) to perform isochronous transfer participates in bus arbitration, then starts packet transfer. In FIG. 26, a channel e, a channel s and a channel k are transferred by the isochronous transfer.

The operation from the bus arbitration to the packet transfer is repeated for the given channels, and when the isochronous transfer in the cycle #m has been completed, the asynchronous transfer can be performed. That is, when the idle period has reached the sub-action gap for the asynchronous transfer, node(s) that is to perform the asynchronous transfer participates in bus arbitration. Note that only if the sub-action gap for starting the asynchronous transfer is detected, after the completion of isochronous transfer and before the next timing to transfer the CSP (cycle synch), the asynchronous transfer can be performed.

In the cycle #m in FIG. 26, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 ms, the next isochronous cycle is shorter than the reference period 125 ms. In this manner, the isochronous cycle can be lengthened or shortened based on the reference period 125 ms.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

Protocol Architecture

FIG. 27 is a view showing the protocol architecture of the 1394 serial bus. Services between the layers and, more particularly, services between the application layer, and the transaction and link layers will be described with reference to FIG. 27. Arrows in FIG. 27 indicate services between the layers.

"TR_DATA.request" shown in FIG. 27 as "TR_DATA.req" means a data transaction service. The application layer or bus management starts WRITE, READ, or LOCK data transaction using this service.

"TR_DATA.confirmation" shown in FIG. 27 as "TR_DATA.conf" means a transaction completion confirmation service. Upon completing the transaction data request, the transaction layer notifies the request-side node of completion of a transaction using this service.

"TR_DATA.indication" shown in FIG. 27 as "TR_DATA.ind" means a transaction request reception indicating service. The transaction layer notifies the application layer, node controller and bus manager of reception of a transaction request using this service.

"TR_DATA.response" shown in FIG. 27 as "TR_DATA.resp" means a transaction data response service. The transaction layer responds to a received packet using this service and completes the transaction.

"LK_ISO_CONT.request" shown in FIG. 27 as "LK_ISO_CONT.req" means an isochronous control request service. The application layer notifies the link layer of an isochronous channel list using this service.

"LK_CYCLE.indication" shown as "LK_CYCLE.ind" means a cycle synchronization indicating service. The link layer notifies the application layer of a cycle synchronization event using this service.

"LK_ISO.request" shown in FIG. 27 as "LK_ISO.req" means an isochronous request service. The application layer requests the link layer using this service to transmit an isochronous packet to the bus.

"LK_ISO.indication" shown in FIG. 27 as "LK_ISO.ind" means an isochronous indicating service. The link layer notifies the application layer of reception of an isochronous packet using this service.

"SB_CONTROL.req", "SB_CONTROL.conf", and "SB_EVENT.ind" have been described in the section "Serial Bus Management", and a detailed description thereof will be omitted herein.

Printing System (Host) Using Isochronous Data Transfer

Figure 28A:
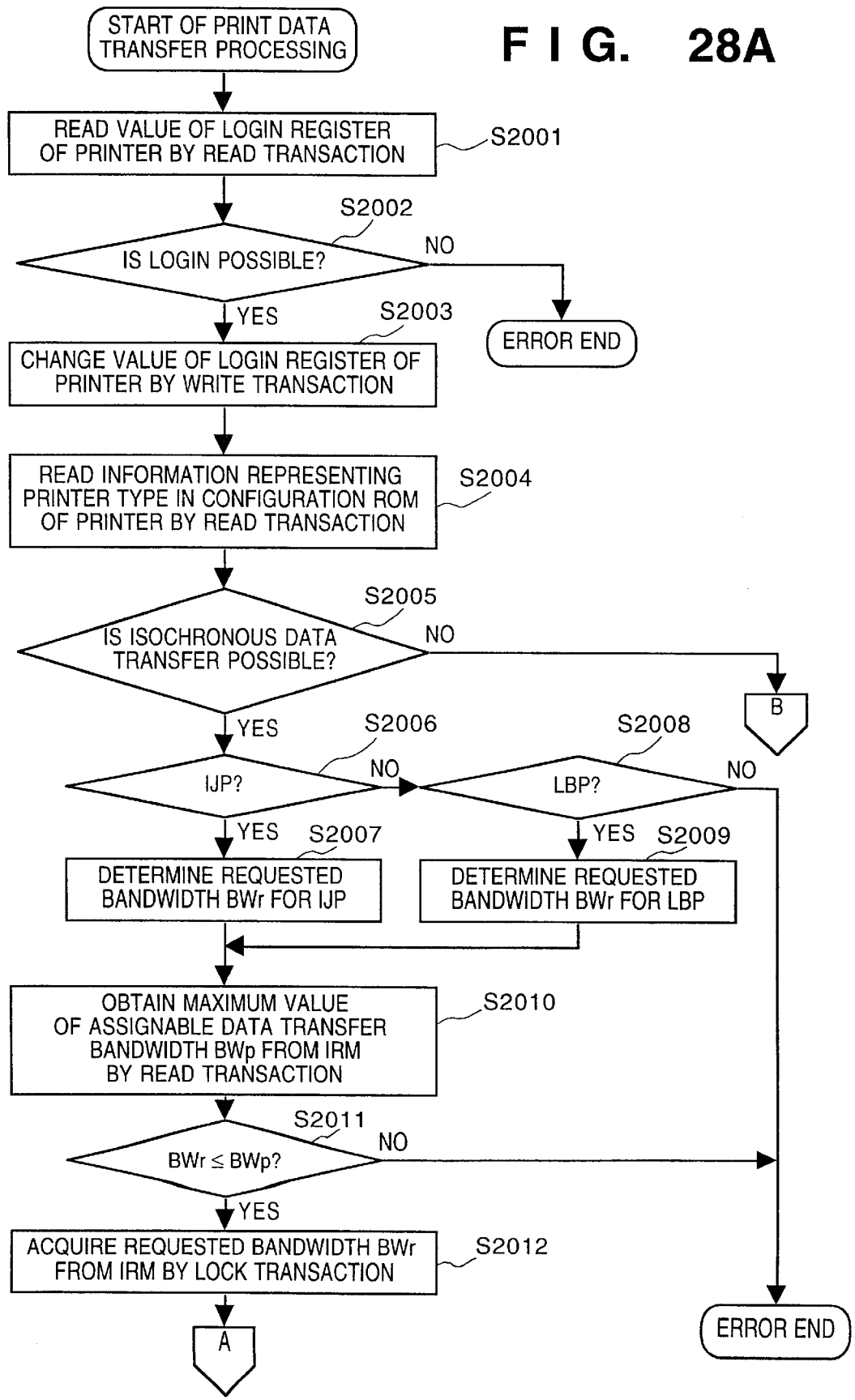
Figure 28B:
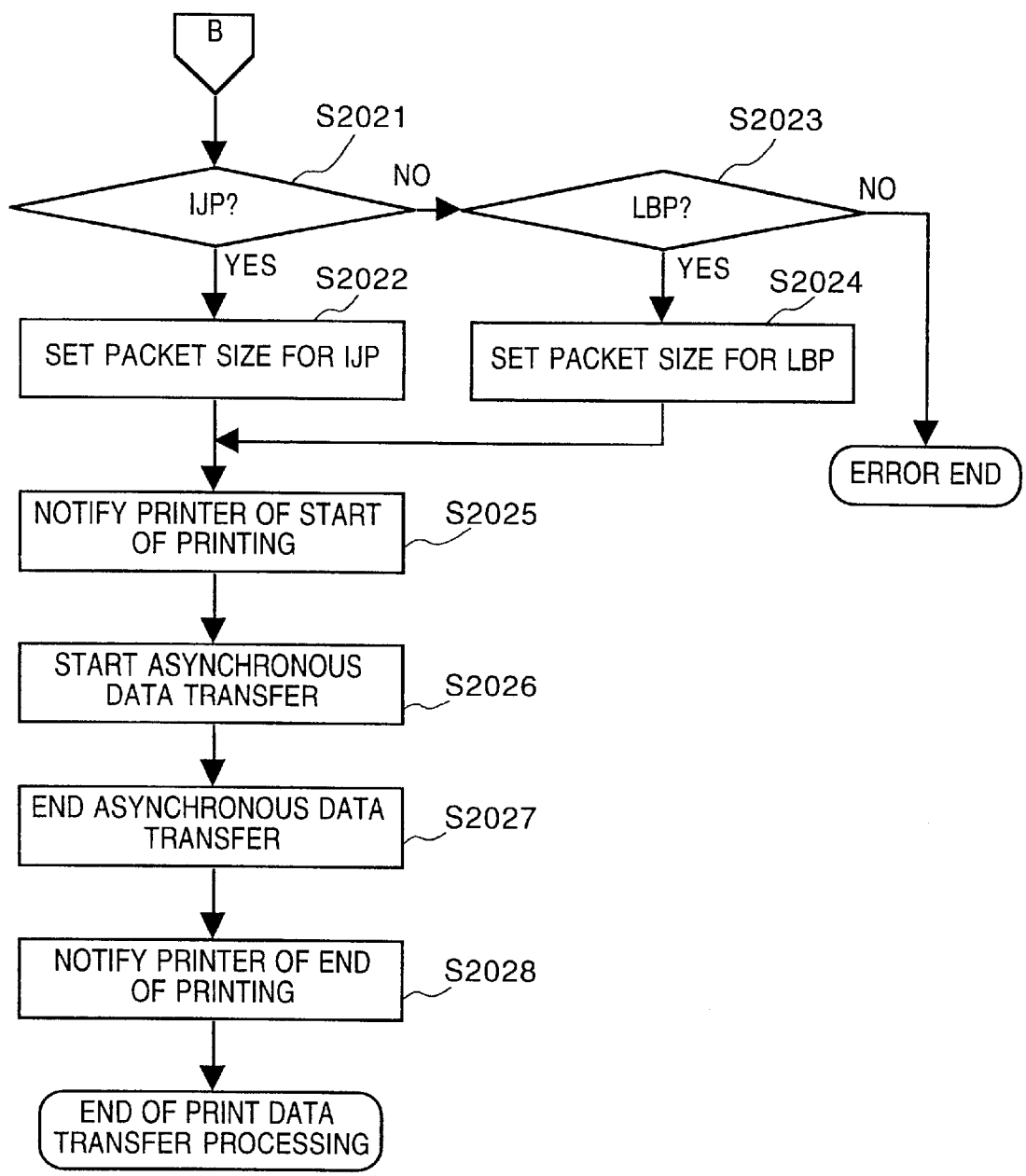

FIGS. 28A to 28C are flowcharts showing a printing sequence in a host device (transfer source node) such as a PC which transfers print data to a printer (transfer destination node) using isochronous data transfer. Before the start of print data transfer processing, the host device must log in the printer as a target device.

The value of the login register of the printer is read by a read transaction (step S2001), whether login is enabled is determined on the basis of the value of the login register (step S2002), and if YES at step S2002, the value of the login register of the printer is changed by a lock transaction (step S2003), thereby establishing login to the printer. If the read value of the login register indicates that login is currently disabled, the application is notified of it, and data transfer processing is ended.

If login to the printer is successful, information representing the printer type is read from the configuration ROM of the printer by a read transaction (step S2004) to determine the printer type. Next, it is determined whether isochronous data transfer is possible (step S2005). This determination consists of first and second determinations. In the first determination, whether the printer can be performed isochronous data transfer or not based on information read in step S2004. The second determination is made on the basis of the cycle master ID contained in "SB_CONT.conf" as a response of the bus manager to "SB_CONTROL.request" issued by the application. When the cycle master ID contained in "SB_CONT.conf" is not 3FH, the cycle master is present. In a case where the first and second determinations indicate that the isochronous data transfer is possible, the isochronous data transfer can be performed. If it is determined that isochronous data transfer is possible, the host determines, on the basis of the printer type, the data transfer bandwidth to be requested to the isochronous resource manager (IRM) (steps S2006 to S2009).

The data transfer bandwidth is changed to optimize the data transfer bandwidth of the entire 1394 serial bus. In print processing using isochronous transfer of the 1394 serial bus, data transfer beyond the printing capability of the printer can be performed. In addition, in isochronous transfer, since the printer must directly receive transferred data (error and retry cannot be repeated for each packet), the data transfer bandwidth must be determined in accordance with the printing capability. For example, a laser beam printer (LBP) and an ink-jet printer (IJP) have a difference in printing capability. In this embodiment, the host reads the value of the register of the printer and determines the data transfer bandwidth to be requested to the isochronous resource manager (IRM), e.g., 5 Mbits/s for a laser beam printer (LBP) and 2 Mbits/s for an ink-jet printer.

Parameters affecting the transfer data amount such as the type of transfer data, i.e., color image data or monochromatic image data are also taken into consideration in addition to the printer type, thereby ensuring an optimum data transfer bandwidth within the printing capability of the printer. With this processing, the data transfer bandwidth of the entire 1394 serial bus can be optimally used. More specifically, color printing requires transfer of a large amount of data, so a larger data transfer bandwidth than that in monochromatic printing is set. However, in some cases, a monochromatic image may be printed at a high speed while placing an importance on its speed, and a color image may be printed at a low speed while placing an importance on its quality. In such a case, for monochromatic data transfer, a larger data transfer bandwidth than that in color data transfer is set.

Even for printers of the same type, the data transfer bandwidth may be changed by setting the printer driver (e.g., a draft mode, a fine mode, or the like). In this case, to acquire the data transfer bandwidth to be used for isochronous data transfer, first, the maximum value of currently assignable data transfer bandwidths must be obtained from the isochronous resource manager (IRM) by a read transaction (step S2010). Next, the data transfer bandwidth determined at steps S2006 to S2009) (to be sometimes referred to as a "requested bandwidth BWr" hereinafter) is compared with the assignable data transfer bandwidth obtained at step S2010 (to be also referred to as an "assignable bandwidth BWp" hereinafter) (step S2011). If the requested bandwidth can be assigned (BWr £ BWp), the requested bandwidth BWr is acquired from the isochronous resource manager (IRM) by a lock transaction (step S2012). If the requested bandwidth BWr cannot be acquired, the application is notified of it, and data transfer processing is ended.

When the requested bandwidth BWr is acquired, channel number determination processing for isochronous transfer is started. The current channel use state is obtained from the isochronous resource manager (IRM) by a read transaction (step S2013). Next, it is checked whether an unused channel is present (step S2014). If YES at step S2014, the channel number is acquired from the isochronous resource manager (IRM) by a lock transaction (step S2015). If NO at step S2014, the application is notified of it, and data transfer processing is ended.

The transfer source node (PC in this case) acquires the requested bandwidth BWr and channel number from the isochronous resource manager (IRM) and then writes the acquired channel number in the channel number register of the transfer destination node (printer in this case) using a write transaction, so that the transfer destination node is notified of the channel number to be used for isochronous data transfer (step S2016). In addition, the printing start bit of the printing start register of the transfer destination node is set by a write transaction to notify the transfer destination node of the start of printing (step S2017), and isochronous data transfer is started (step S2018). Upon completing isochronous data transfer (step S2019), the printing end bit of the printing start register of the transfer destination node is set by a write transaction, so that the transfer destination node is notified of the end of printing (step S2020).

If NO at step S2005, the process proceeds to step S2021 to determine on the basis of the information representing the printer type, which has been obtained at step S2004, whether the printer as the data transfer destination is an ink-jet printer (IJP). If YES at step S2021, the process proceeds to step S2022 to set a packet size for asynchronous transfer of data for the ink-jet printer.

If NO at step S2021, the process proceeds to step S2023 to determine whether the printer is a laser beam printer (LBP). If YES at step S2023, the process proceeds to step S2024 to set a packet size for asynchronous transfer of data for the laser beam printer. In this embodiment, an asynchronous packet size suitable for each printer can be determined at step S2022 or S2024.

Next, the data transfer destination is notified of the start of printing (step S2025), and then, asynchronous data transfer is started (step S2026). Upon completing asynchronous data transfer (step S2027), the data transfer destination is notified of the end of printing at step S2028.

At step S2005, whether isochronous data transfer is possible is determined on the basis of whether the printer can be performed the isochronous data transfer, and whether a cycle master is present on the 1394 serial bus. The presence/absence of a cycle master is indicated by "SB_CONT.conf" shown in FIG. 27.

Arrangement of Laser Beam Printer

Figure 29:
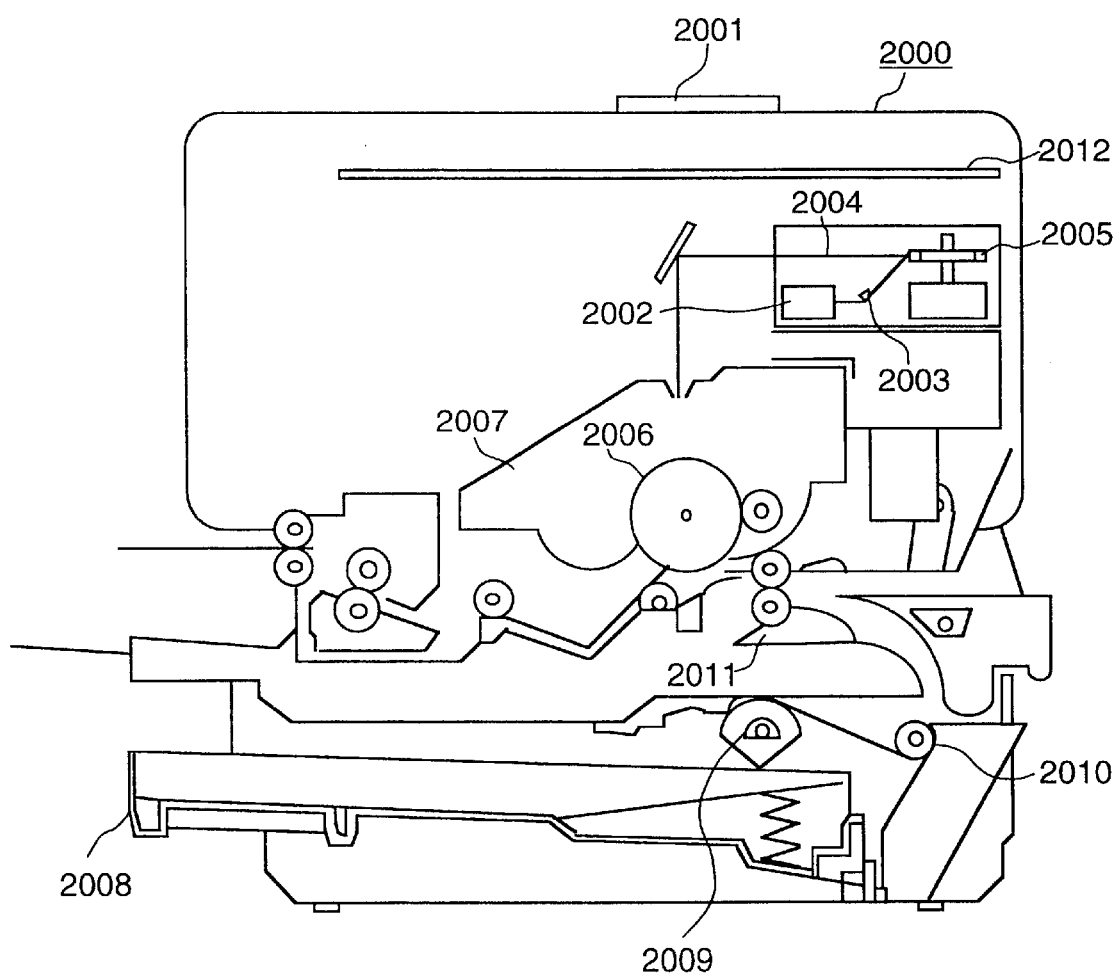
FIG. 29 is a sectional view showing a laser beam printer.

FIG. 29 is a sectional view showing the arrangement of a first output device, e.g., a laser beam printer (LBP).

Referring to FIG. 29, a LBP main body 2000 receives printing information (e.g., a character code), form information, or a macroinstruction supplied from an externally connected host computer, stores the information, and at the same time, prepares a character pattern or form pattern corresponding to the information and forms an image on a recording paper sheet as a recording medium.

An operating panel 2001 has switches for operation or LED display device. A printer control unit 2012 controls the entire LBP main body 2000 and analyzes character information supplied from the host computer. This printer control unit 2012 mainly converts the supplied character information into a video signal of a corresponding character pattern and outputs the signal to a laser driver 2002.

The laser driver 2002 is a circuit for driving a semiconductor laser device 2003. The laser driver 2002 ON/OFF-controls light emission of the semiconductor laser device 2003 in accordance with an input video signal to control a laser beam 2004 emitted by the semiconductor laser device 2003. The laser beam 2004 is deflected by a rotary polygon mirror 2005 in the right and left directions to scan/expose a photosensitive drum 2006. With this operation, the electrostatic latent image of, e.g., a character pattern is formed on the photosensitive drum 2006. This latent image is developed by a developing unit 2007 disposed around the photosensitive drum 2006 and transferred to a recording paper sheet. A cut sheet is used as the recording paper sheet. The cut sheets as recording paper are stored in a recording paper cassette 2008 loaded in the LBP main body 2000, supplied into the apparatus by a feed cam 2009, a convey roller 2010, and a registration roller 2011, and then supplied to the photosensitive drum 2006. The LBP main body 2000 has at least one card slot (not shown) so that optional font cards other than so-called incorporated fonts stored in a ROM incorporated in the LBP main body 2000 or different control cards (emulation cards) of the printer command system can be connected.

Figure 30:
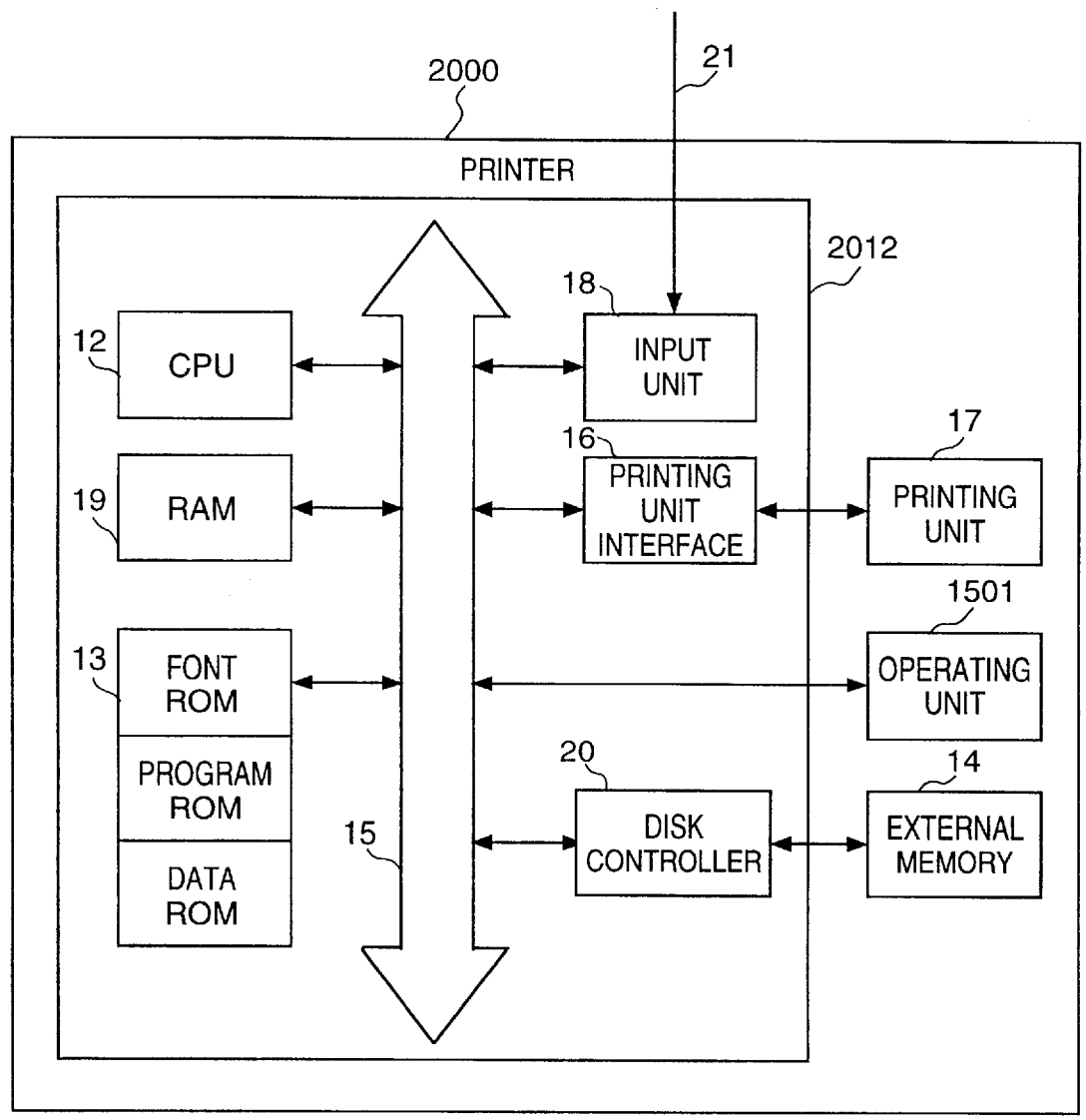
FIG. 30 is a block diagram showing the arrangement of the laser beam printer.

FIG. 30 is a block diagram for explaining the arrangement of the LBP main body 2000 of this embodiment.

A CPU 12 entirely controls access to various devices connected to a system bus 15 on the basis of a control program stored in a program ROM of a ROM 13 or a control program stored in an external memory 14 to output the above-described video signal to a printing unit (printer engine) 17 connected through a printing unit interface 16.

The font ROM of the ROM 13 stores font data or the like to be used to generate the above-described video signal. In a printer having no external memory 14 such as a hard disk, the data ROM of the ROM 13 stores various kinds of information to be used on the host computer. In this embodiment, the various kinds of information of the printer can be accessed from an external device through an input unit 18 as an IEEE 1394 interface. These pieces of information include information for alarming the number of sheets remaining in the recording paper cassette 2008. Access to these pieces of information will be described later in sections of the printer-side serial bus configuration ROM and status register.

A RAM 19 is a memory used by the CPU 12 as a main memory or work area and can expand its memory capacity using an optional RAM connected to an expansion port (not shown). Note that the RAM 19 is used as a printing image developing area, an environment data storage area, or an NVRAM.

Access to the external memory 14 constituted by a hard disk (HD) or an IC card is controlled by a disk controller 20. The external memory 14 is optionally connected to store font data, an emulation program, form data, and the like. The input unit 18 is connected to the switches and LED display device arranged on the above-described operating panel 2001.

The number of external memories is not limited to one, and one or more external memories 14 can be arranged to connect a plurality of optional font cards or cards storing a program for interpreting different printer control languages of the print command system. In addition, the external memory 14 may have an NVRAM (not shown) to store information representing a printer mode set from the operating panel 2001.

Arrangement of Ink-Jet Printer

Figure 31:
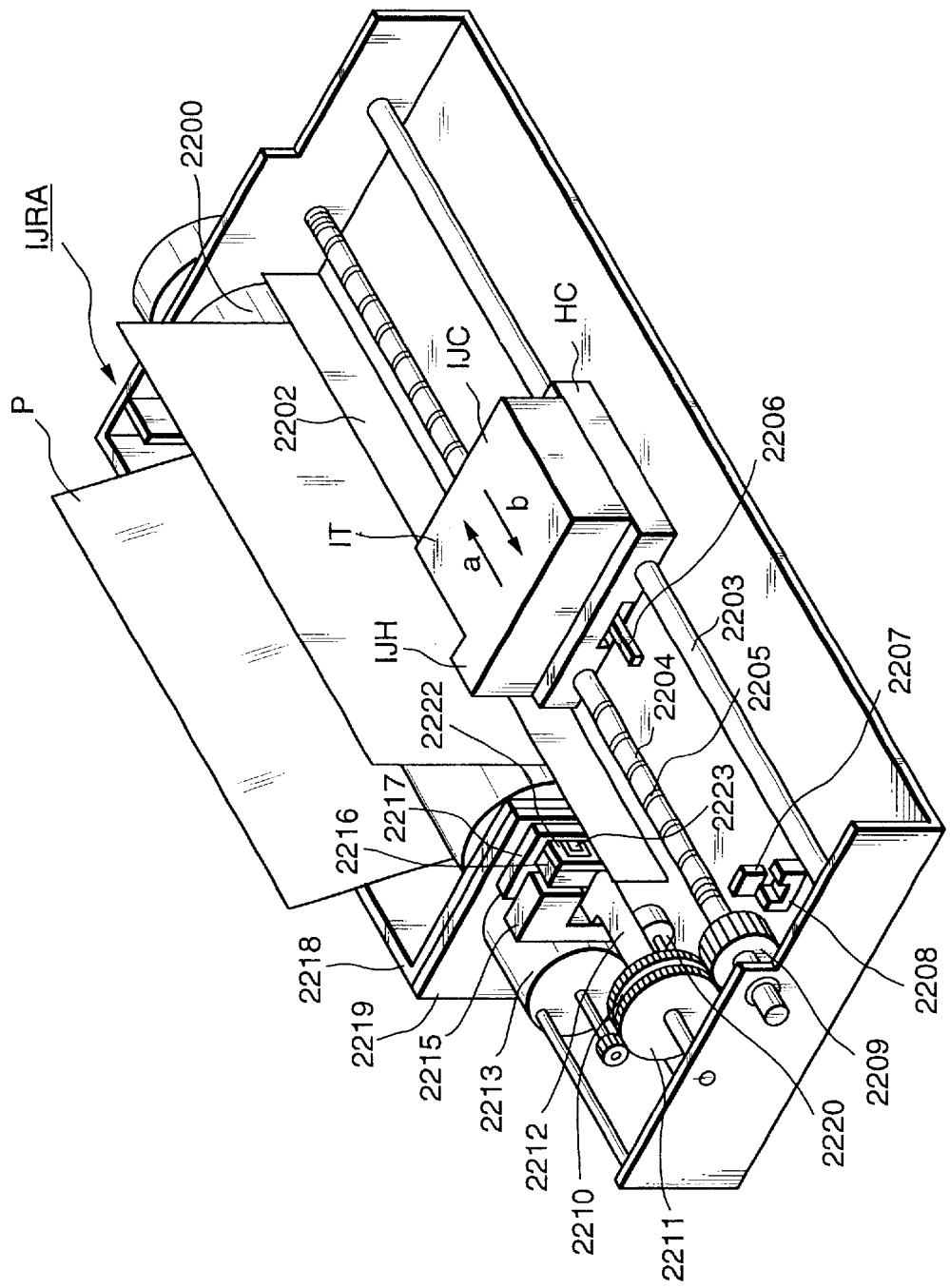
FIG. 31 is a perspective view showing an ink-jet printer.

FIG. 31 is a perspective view showing the arrangement of a second output device of this embodiment, e.g., an ink-jet printer.

Referring to FIG. 31, a carriage HC engaging through a pin (not shown) with a guide groove 2205 of a lead screw 2204 which is rotated through driving force transmission gears 2211 and 2209 is interlocked with the forward/reverse rotation of a driving motor 2213 to reciprocally move in directions indicated by arrows a and b. An ink cartridge IJC is mounted on the carriage HC. A color ink-jet cartridge CIJC having color inks and a monochrome ink-jet cartridge MIJC having only a black ink are prepared as the ink cartridge IJC of this printer.

A paper press plate 2202 presses a paper sheet against a platen 2200 along the moving direction of the carriage HC. Photosensors 2207 and 2208 detect a lever 2206 belonging to the carriage HC to determine whether the carriage HC is at the home position. The rotational direction of the motor 2213 is switched upon detecting the home position.

The printer shown in FIG. 31 has an automatic sheet feeder capable of automatically supplying a plurality of paper sheets. When a paper sheet which is currently being printed, i.e., being on the platen 2200 is delivered, the automatic sheet feeder guides the next paper sheet to the feed insertion port of the printer. When the paper sheet is detected after delivery by a paper sensor at the feed insertion port, the printer feeds the next paper sheet onto the platen 2200. The paper tray of the automatic sheet feeder has a remaining paper count sensor for detecting the number of remaining paper sheets. If the number of paper sheets set in the automatic sheet feeder decreases to a predetermined number, the remaining paper count sensor responds to it.

A member 2216 supports a cap 2222 for covering the entire surface of the print head of the ink-jet cartridge IJC. A suction unit 2215 draws the air in the cap 2222 to perform suction recovery of the print head through an opening 2223 in the cap. A cleaning blade 2217 can be moved by a member 2219 in the front and rear directions. A plate 2218 supports the cleaning blade 2217 and the member 2219 on the printer main body. A lever 2212 starts suction for recovery and is moved in accordance with movement of a cam 2220 engaging the carriage HC. The driving force of the driving motor 2213 is transmitted to the suction unit 2215 by, e.g., clutch switching by movement of the lever 2212.

Of these capping, cleaning, and suction recovery operations, desired processing is performed at a corresponding position by the function of the lead screw 2204 when the carriage HC enters the region on the home position side, although a desired operation may be performed at a known timing.

Figure 32:
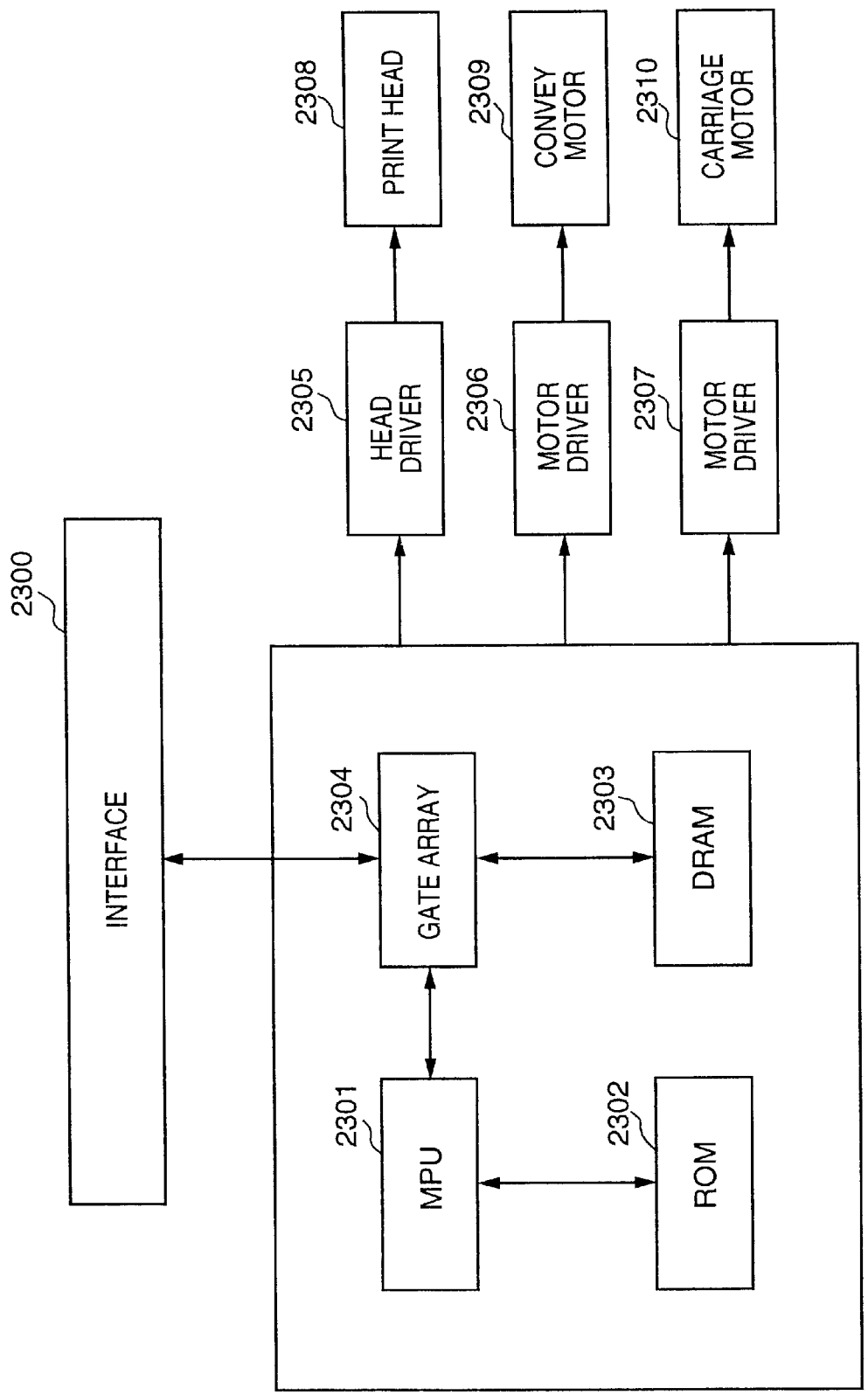
FIG. 32 is a block diagram showing the arrangement of the ink-jet printer.

FIG. 32 is a block diagram for explaining the control arrangement of the output device shown in FIG. 31.

Referring to FIG. 32, reference numeral 2300 denotes an interface for performing communication with the host computer; 2301, an MPU; 2303, a ROM storing a control program to be executed by the MPU 2301 or host printing information; and 2303, a DRAM storing various data (e.g., an image signal to be printed or recording data to be supplied to the head).

A gate array 2304 performs output data supply control for a print head 2308 and also performs data transfer control between the interface 2300, the MPU 2301, and the DRAM 2303. Reference numeral 2310 denotes a carriage motor for conveying the carriage HC having the print head 2308; 2309, a convey motor for conveying a recording paper sheet; 2305, a head driver for driving the print head 2308; and 2307, a motor driver for driving the carriage motor 2310.

In the ink-jet printer having the above arrangement, when print data is input from the host computer (to be described later) through the interface unit 2300, the input print data is converted between the gate array 2304 and the MPU 2301 into output information for driving the print head 2308. The motor drivers 2306 and 2307 are driven, and the print head 2308 is driven in accordance with the output information sent to the head driver 2305 to execute printing.

Various kinds of information of the printer can be accessed from an external device through the interface 2300. These pieces of information include the above-described information representing the type of actually mounted one of ink-jet cartridges IJC mountable on the carriage HC, and information for alarming the number of paper sheets remaining on the automatic sheet feeder. Access to these pieces of information will be described later in sections of the printer-side serial bus configuration ROM and status register.

Construction of IEEE 1394 Interface of Printer

The laser beam printer as the first output device of this embodiment or the ink-jet printer as the second output device is connected to the host device using the 1394 serial bus. A block for interfacing the 1394 serial bus (to be referred to as a "1394 I/F block" hereinafter) is the input unit 18 shown in FIG. 30 for a laser beam printer, and the interface 2300 shown in FIG. 32 for an ink-jet printer.

The construction of the 1394 I/F block will be described next. The following description applies to both printers because the basic construction of the 1394 I/F block for a laser beam printer is the same as that for an ink-jet printer. Portions unique to each printer will be described as needed.

Figure 33:
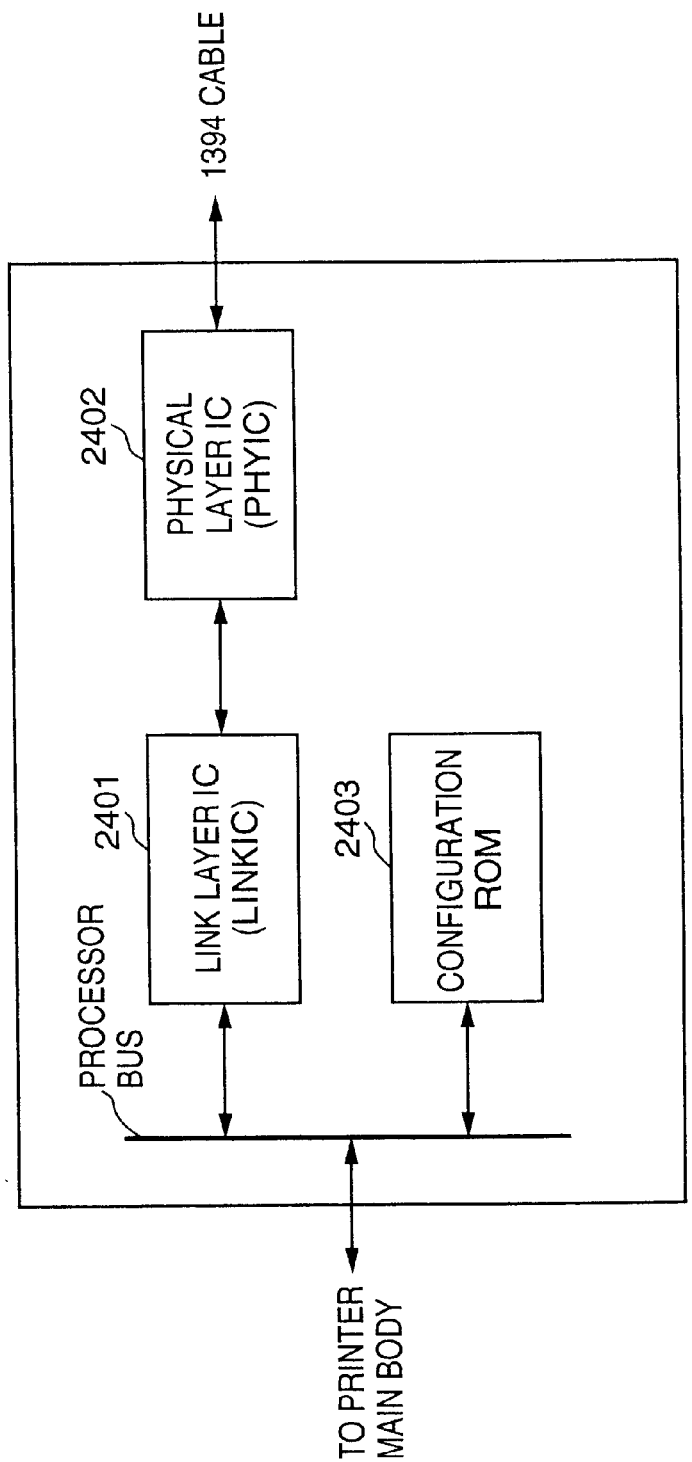
FIG. 33 is a view showing the basic construction of the 1394 interface block.

FIG. 33 is a block diagram showing the basic construction of the 1394 I/F block.

A physical layer control IC (PHYIC) 2402 directly drives the 1394 serial bus and realizes the function of the physical layer which has been described in "Outline of 1394 Serial Bus". The physical layer control IC 2402 mainly functions to perform bus initialization, arbitration, encode/decode of transmission data, monitoring of the cable energization state, supply of a load terminal power supply (for active connection recognition), and interface to a LINKIC 2401 to be described later.

The link layer control IC (LINKIC) 2401 interfaces the printer main body and controls data transfer of the PHYIC 2402. The LINKIC 2401 realizes the link layer function which has been described in "Outline of 1394 Serial Bus".

Figure 34:
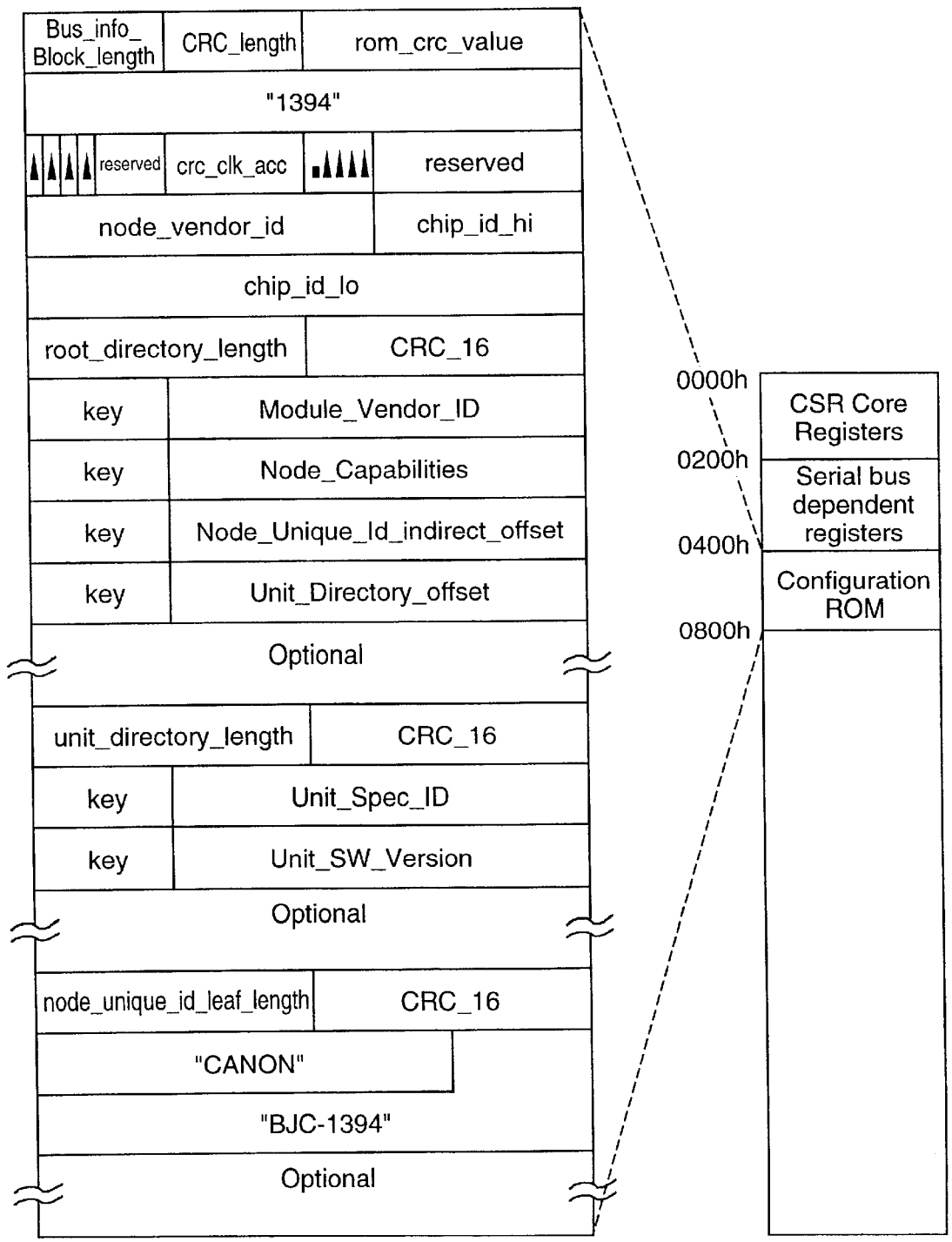
FIGS. 34 and 35 are views for explaining data to be stored in the configuration ROM.
Figure 35:
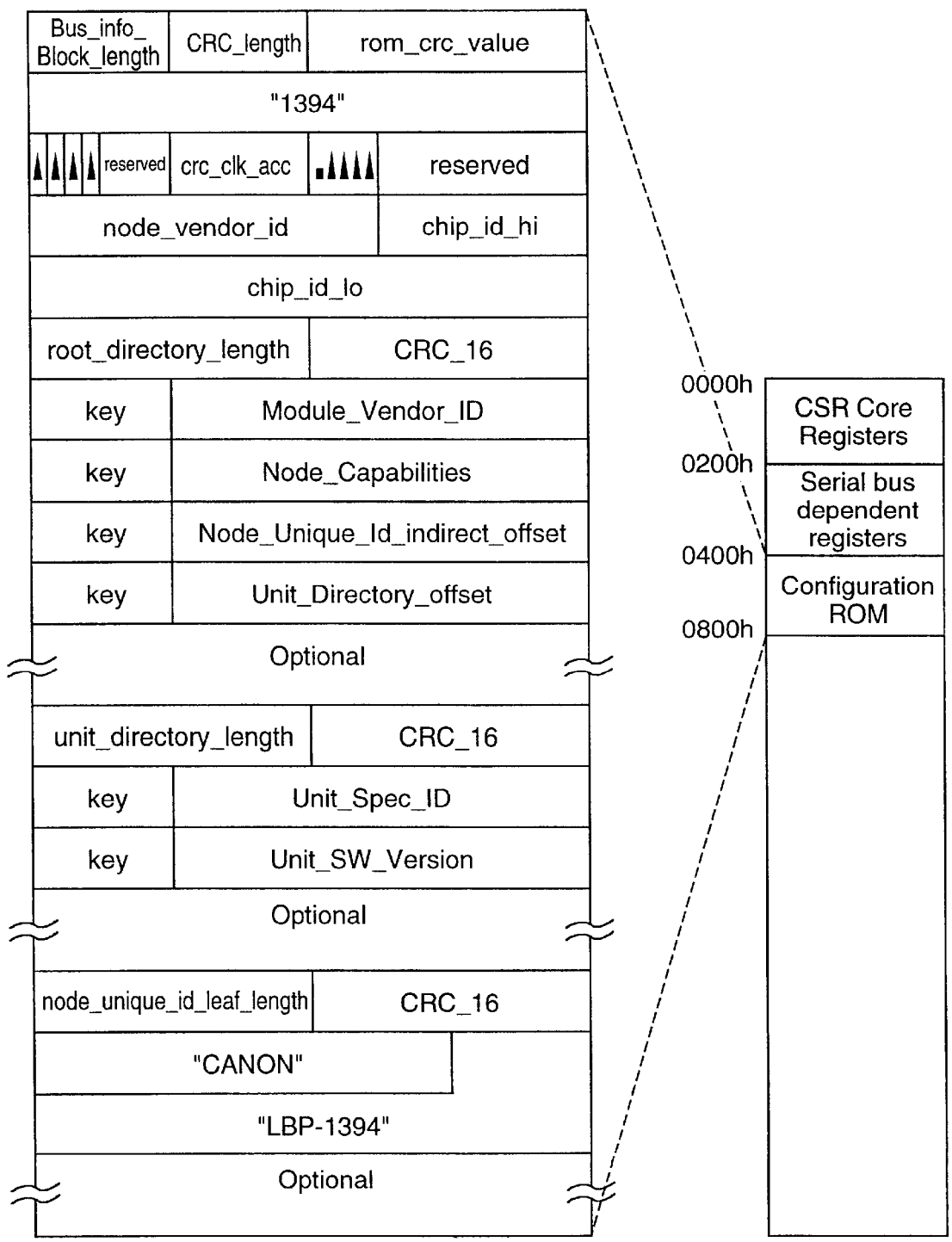

The main functions of the LINKIC 2401 include a transmission/reception FIFO function of temporarily storing transmitted/received data through the PHYIC 2402, a transmission data packet generation function, a determination function of determining whether data received by the PHYIC 2402 is addressed to the self node address, a determination function of determining isochronous transfer data received by the PHYIC 2402 is addressed to the allocated channel, a receiver function of checking errors in received data, and an interface function of interfacing the printer main body. A configuration ROM 2403 stores identification information unique to each device or communication conditions. The data format of the configuration ROM complies with the format defined by the IEEE 1394 standard although, as data unique to each device, data unique to the laser beam printer or ink-jet printer is prepared. FIG. 35 shows data stored in the configuration ROM 2403 of the laser beam printer of this embodiment. FIG. 34 shows data stored in the configuration ROM 2403 of the ink-jet printer of this embodiment.

Figure 36A:
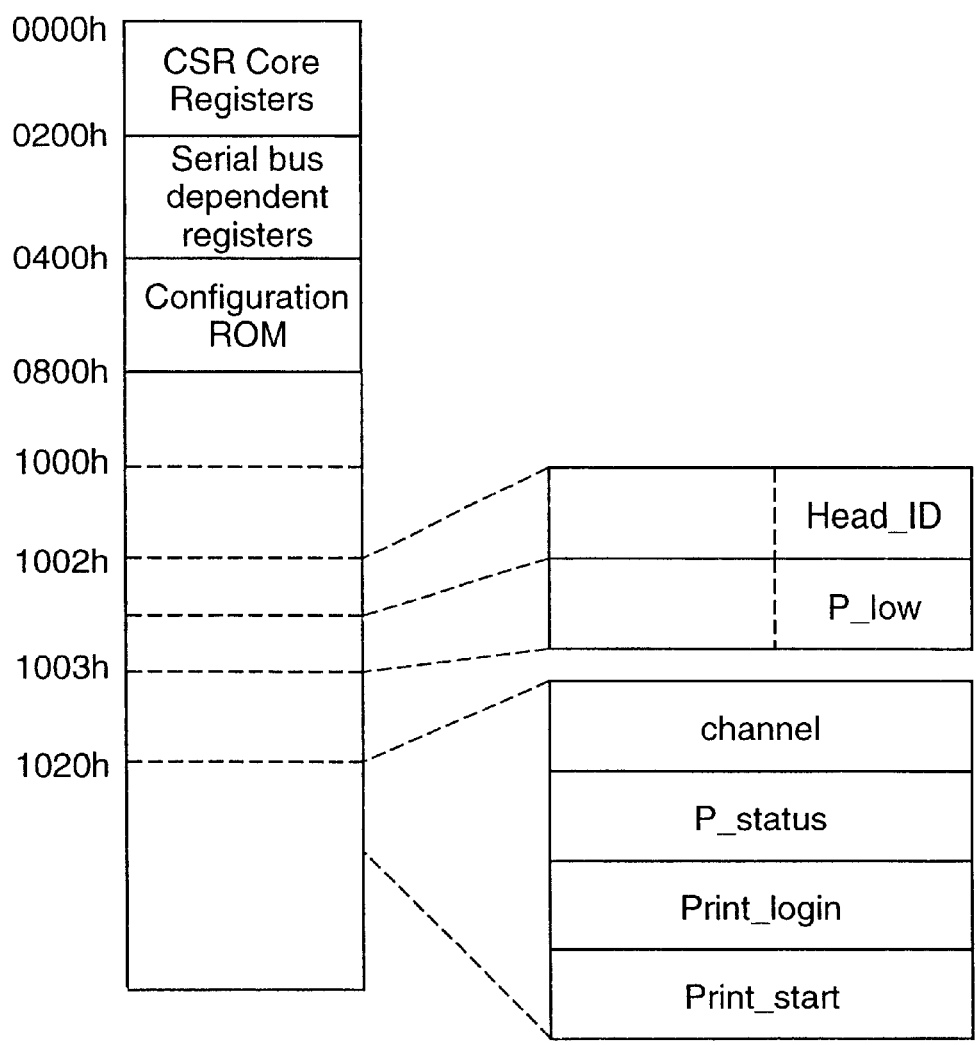
FIGS. 36A and 36B are views for explaining data to be stored in the configuration ROM.
Figure 36B:
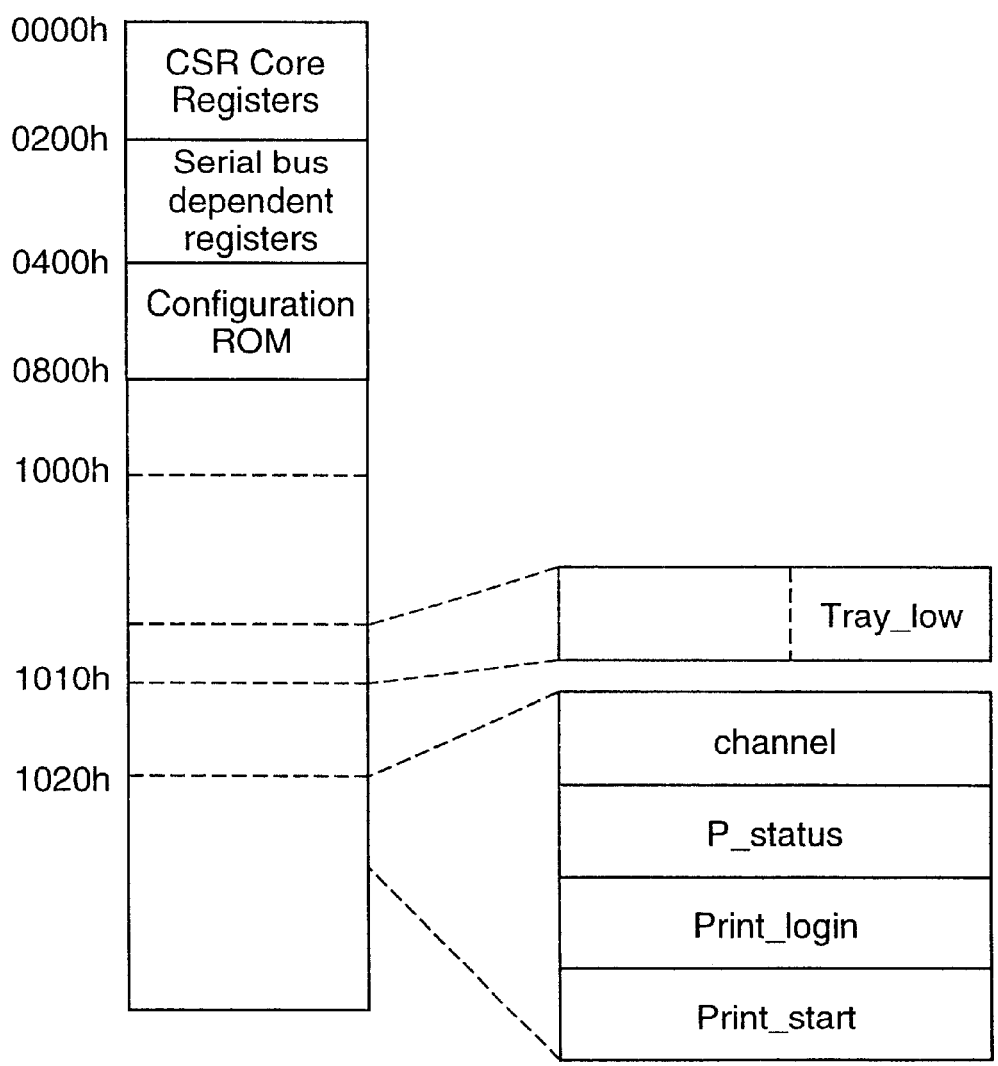

As described above in "Outline of 1394 Serial Bus", in address setting of the 1394 serial bus, final 28 bits are ensured as a data area unique to each device, which can be accessed from another device connected to the 1394 serial bus. FIGS. 36A and 36B are views showing the 28-bit address space in the ink-jet printer and the laser beam printer of this embodiment, respectively. The above-described configuration ROM 2403 is arranged in an area from address 400*h* to address 800*h* shown in FIGS. 36A and 36B.

Registers associated with operations unique to each printer are arranged in areas subsequent to the configuration ROM 2403 from address 800*h*. These registers are physically arranged in the control portion of each printer, i.e., in the gate array 2304 shown in FIG. 32 for an ink-jet printer, and in the CPU 12 shown in FIG. 30 for a laser beam printer.

Four registers starting from address 1020*h* are common to both printers. The channel register stores the channel number allocated in isochronous data transfer between the printer and the host. The P_status register stores a status representing the operating state of the printer. In the Print_login register, a login bit is set when the host logs in the printer to ensure the printer resource. In the Print_start register, a bit is set by the host at the start/end of print data transfer.

In the ink-jet printer or laser beam printer of this embodiment, the status register group for monitoring the operating state of the printer and a control register group for controlling the operation of the printer are arranged from address $1000h$. FIGS. 36A and 36B show part of these register groups.

In the ink-jet printer of this embodiment, e.g., the Head_ID register at address $1002h$ stores information associated with the type of print head attached to the ink-jet cartridge IJC loaded on the carriage HC of the printer (when the color ink-jet cartridge CIJC is mounted, a value of "1" is stored in the Head_ID register of this embodiment, and when the monochrome ink-jet cartridge MIJC is mounted, a value of "0" is stored). The current printer status is displayed at address $1003h$. The output value of the above-described remaining paper count sensor of the automatic sheet feeder is stored in bit 0 (P_low) of this register. More specifically, when the remaining number of paper sheets placed on the automatic sheet feeder decreases the a predetermined amount, a value of "1" is set in P_low.

In the laser beam printer of this embodiment, the current status of the recording paper cassette 2008 is displayed at, e.g., address $1010h$. The value of the remaining paper count sensor set in the recording paper cassette 2008 is stored in bit 0 (Tray_low) of this register. More specifically, when the number of remaining of paper sheets placed on the recording paper cassette 2008 decreases to a predetermined amount, a value of "1" is set in Tray_low.

Print Processing of Printer

Figure 37:
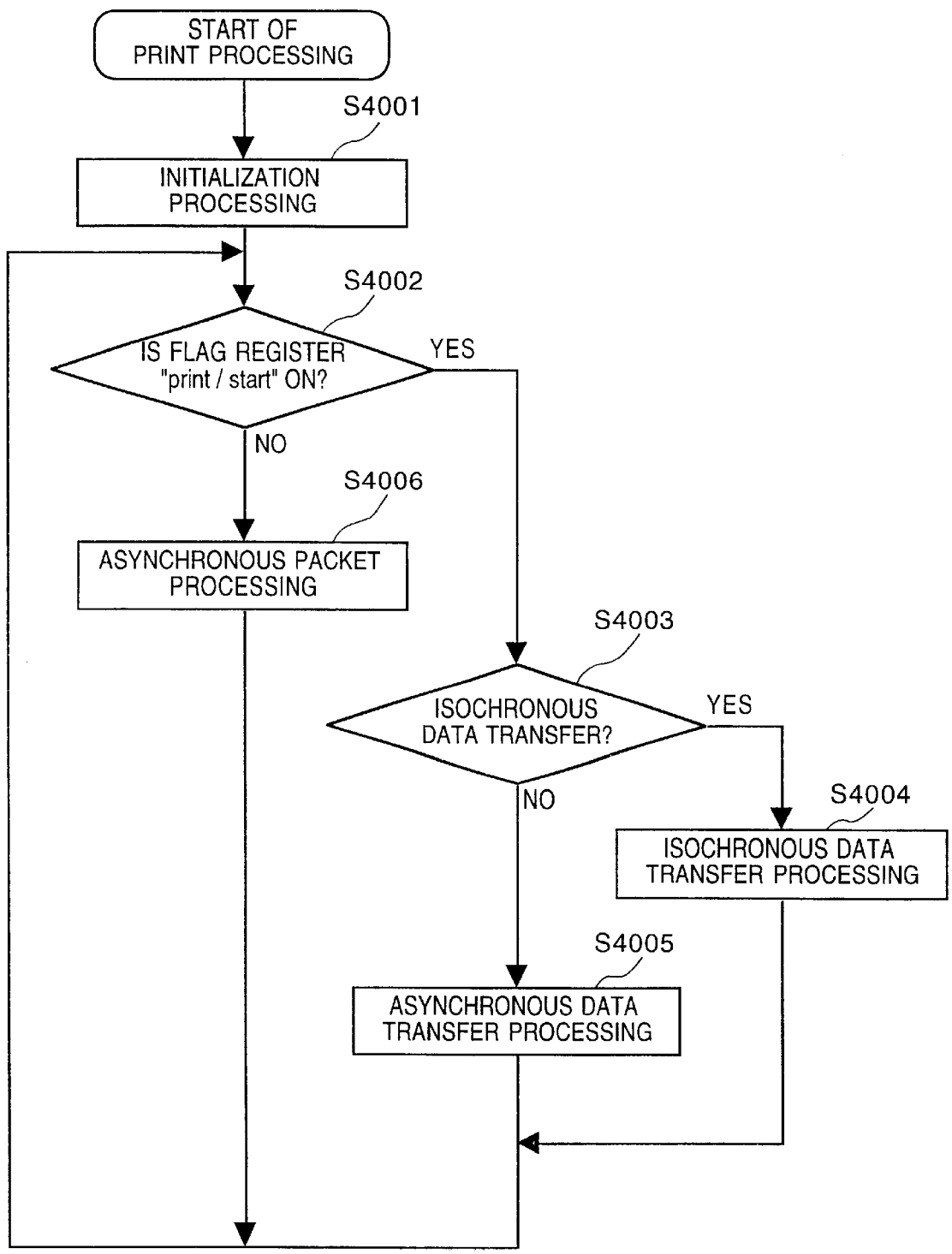
FIG. 37 is a flowchart showing the printing sequence in a printer.

Print processing of the printer will be described below in detail with reference to flowcharts. FIG. 37 is a flowchart showing print processing of the printer.

Initialization processing is performed at step S4001. In initialization processing, the flag register and IEEE 1394 interface necessary for printing, and the printer are initialized.

It is checked at step S4002 whether the flag register "print.start" representing the start of printing is ON. The "print.start" is set in accordance with an asynchronous command packet sent from the host device and represents whether print data can be received.

If YES at step S4002, the process proceeds to step S4003 to determine whether isochronous data transfer is to be performed. If YES at step S4003, the process proceeds to step S4004 to perform isochronous data transfer processing. In isochronous data transfer processing, data sent from the host device as an isochronous data packet is received through the IEEE 1394 interface, and this processing will be described later in detail with reference to FIG. 41.

If NO at step S4003, the process proceeds to step S4005 to perform asynchronous data transfer processing. In asynchronous data transfer processing, data sent from the host device as an asynchronous data packet is received through the IEEE 1394 interface, and this processing will be described later in detail with reference to FIG. 43.

If NO at step S4002, the process proceeds to step S4006 to perform asynchronous packet processing. In asynchronous packet processing, a command sent from the host device as an asynchronous data packet is processed. This processing is performed to set information in the printer, set the IEEE 1394 interface, or instruct to start/end printing.

Asynchronous Packet Processing

Figure 38:
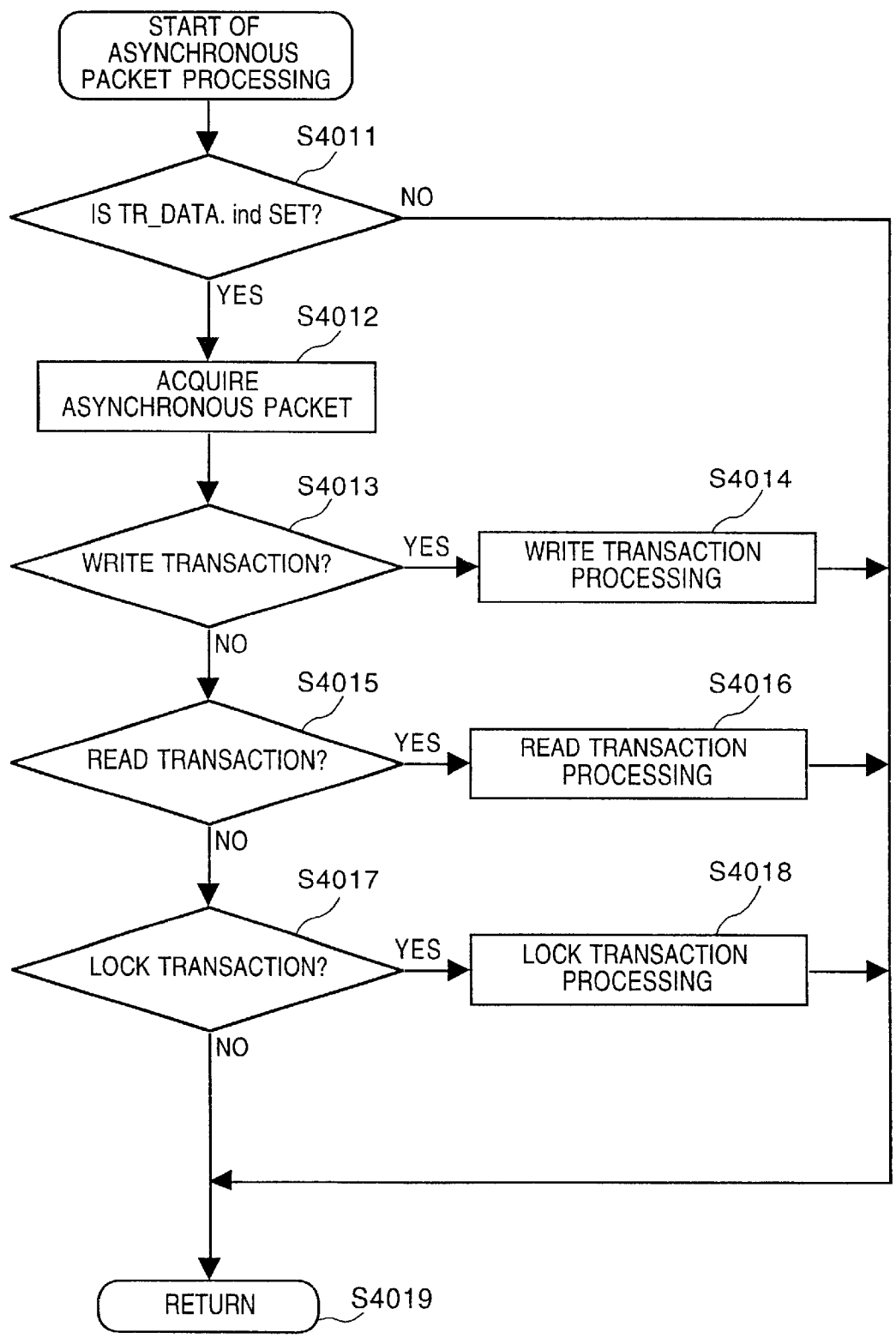
FIG. 38 is a flowchart showing synchronous packet processing.

FIG. 38 is a flowchart showing asynchronous packet processing in which a write transaction for setting information sent from the host device and instructing to start/end printing, a read transaction for causing the host device to read printer set information, and a lock transaction for causing the host device to ensure the printer resource are performed.

It is checked at step S4011 whether "TR_DATA.ind" is set. "TR_DATA.ind" indicates that an asynchronous packet has been received by the transaction layer. If NO at step S4011, the process returns to step S4002 shown in FIG. 37. If YES at step S4011, the process proceeds to step S4012 to receive the asynchronous packet from the transaction layer. The general format of the asynchronous packet is shown in FIG. 24.

The process proceeds to step S4013 to check whether the received asynchronous packet represents a write transaction. The transaction represented by the asynchronous packet is set in "tcode" in the asynchronous packet, as shown in FIGS. 24 and 25. That is, whether the asynchronous packet indicates a write transaction is determined on the basis of the value set in "tcode". In a write transaction, the process proceeds to step S4014 to perform write transaction processing. In write transaction processing, information is written in the unit space of the printer, and this processing will be described later in detail with reference to FIG. 39. Upon completing write transaction processing, the process returns to step S4002 shown in FIG. 37.

If NO at step S4013, the process proceeds to step S4015 to check whether the asynchronous packet represents a read transaction. This check is also made on the basis of the value of "tcode" in the asynchronous packet. In a read transaction, the process proceeds to step S4016 to perform read transaction processing. In read transaction processing, the value set in the unit space such as the configuration ROM in the printer is read by the host device while designating the address. A response packet containing data at the address designated by the host device is returned to the host device. The read transaction will be described later in detail with reference to FIG. 40. Upon completing read transaction processing, the process returns to step S4002 shown in FIG. 37.

If NO at step S4015, the process proceeds to step S4017 to check whether the asynchronous packet represents a lock transaction. This check is also made on the basis of the value of "tcode" in the asynchronous packet. In a lock transaction, the process proceeds to step S4018 to perform lock transaction processing. In lock transaction processing, data to be written in a predetermined register and the original data of the register are received from the host device, and if the value of the original data is correct, the write data is set in the register. Upon completing lock transaction processing, the process returns to step S4002 shown in FIG. 37.

Figure 39:
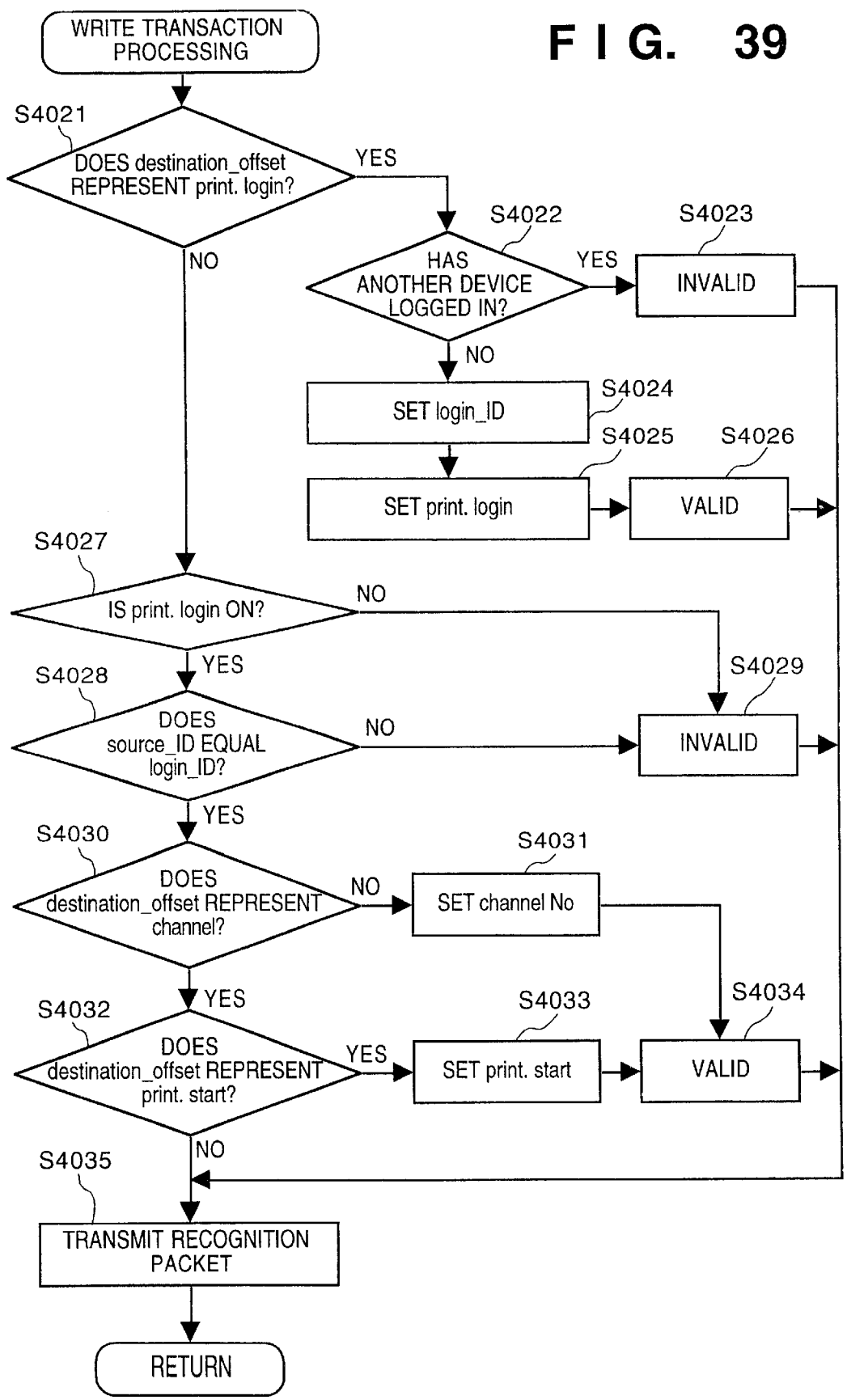
FIG. 39 is a flowchart showing write transaction processing.

FIG. 39 is a flowchart showing write transaction processing as write processing in the unit space of the printer. At step S4021, it is checked whether the "destination_offset" of the asynchronous packet indicates "print.login". An address is set in the "destination_offset" of the asynchronous packet shown in FIG. 22. This address indicates a specific address of the unit space of the printer, and the contents of the instruction from the host device can be known from this address.

The "print.login" performed as the first processing when the host device is to make a printer perform printing is a declaration of use of a specific printer by a certain host device. The printer which has received the declaration from the host device responds to only the host device which has issued the declaration, thereby preventing the printer from simultaneously receiving instructions from a plurality of host devices. If YES at step S4021, the process proceeds to step S4022 to check whether another host device has already logged in the printer. If YES at step S4022, this asynchronous packet is invalid, so the process proceeds to step S4023 to set "invalid". The process proceeds to step S4035 to transmit a recognition packet indicating "invalid", and the process returns to processing shown in FIG. 38.

If NO at step S4022, the process proceeds to step S4024 to set the "login_ID". The "login_ID" is the node number of the host device indicated by the "source_ID" of the asynchronous packet shown in FIG. 22. In subsequent asynchronous packet processing, only asynchronous packets from the host device having the node number (source_ID) equal to the "login_ID" are processed.

The process proceeds to step S4025 to set the "print.login" representing that the printer has been logged in, to step S4026 to set "valid", and then to step S4035 to transmit a recognition packet representing "valid", and returns to processing shown in FIG. 38.

If NO at step S4021, the process proceeds to step S4027 to check whether the "print.login" has been set. NO at step S4027 means that an improper write transaction other than login has been requested although the printer has not been logged in. The process proceeds to step S4029 to set "invalid". The process proceeds to step S4035 to transmit a recognition packet representing "invalid", and returns to processing shown in FIG. 38.

If YES at step S4027, the process proceeds to step S4028 to check whether the "source_ID" of the asynchronous packet equals the "login_ID". If NO at step S4028, the asynchronous packet is a packet from a device other than the host device which is logging in, so the process proceeds to step S4029 to set "invalid". The process proceeds to step S4035 to transmit a recognition packet representing "invalid", and returns to processing shown in FIG. 38.

If YES at step S4028, the process proceeds to step S4030 to check whether the "destination_offset" represents a "channel". The "channel" indicates the channel number used to transfer an isochronous packet. If YES at step S4030, the process proceeds to step S4031 to set the channel number. The process proceeds to step S4034 to set "valid" and then to step S4035 to transmit a recognition packet representing "valid", and returns to processing shown in FIG. 38.

If NO at step S4030, the process proceeds to step S4032 to check whether the destination_offset represents the "print.start". If YES at step S4032, the process proceeds to step S4033 to set the "print.start". The process proceeds to step S4034 to set "valid" and then to step S4035 to transmit a recognition packet representing "valid", and returns to processing shown in FIG. 38.

Figure 40:
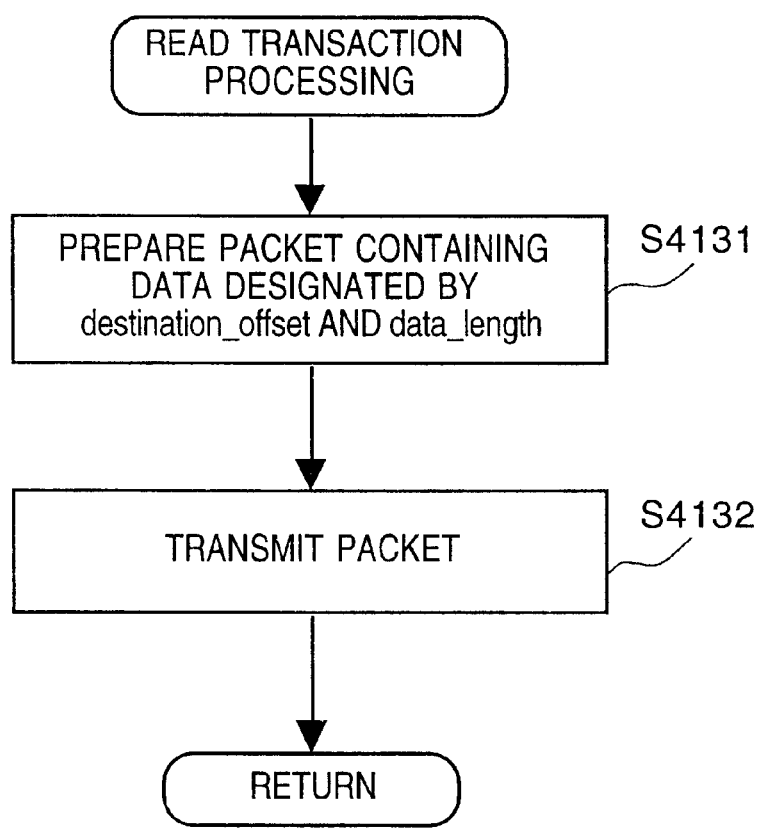
FIG. 40 is a flowchart showing read transaction processing.

FIG. 40 is a flowchart showing read transaction processing.

At step S4131, a packet in which data having a size indicated by the "data_length" (FIG. 22) is set in an area indicated by the "data_field" (FIG. 22) from the address indicated by the "destination_offset" is prepared. Next, at step S4132, the prepared packet is transmitted to the host device which has requested the read transaction.

Asynchronous packet processing has been described using FIGS. 38 to 40. Various setting processing operations between devices for communicating data are executed in accordance with asynchronous packets.

Isochronous Data Transfer Processing

Figure 41:
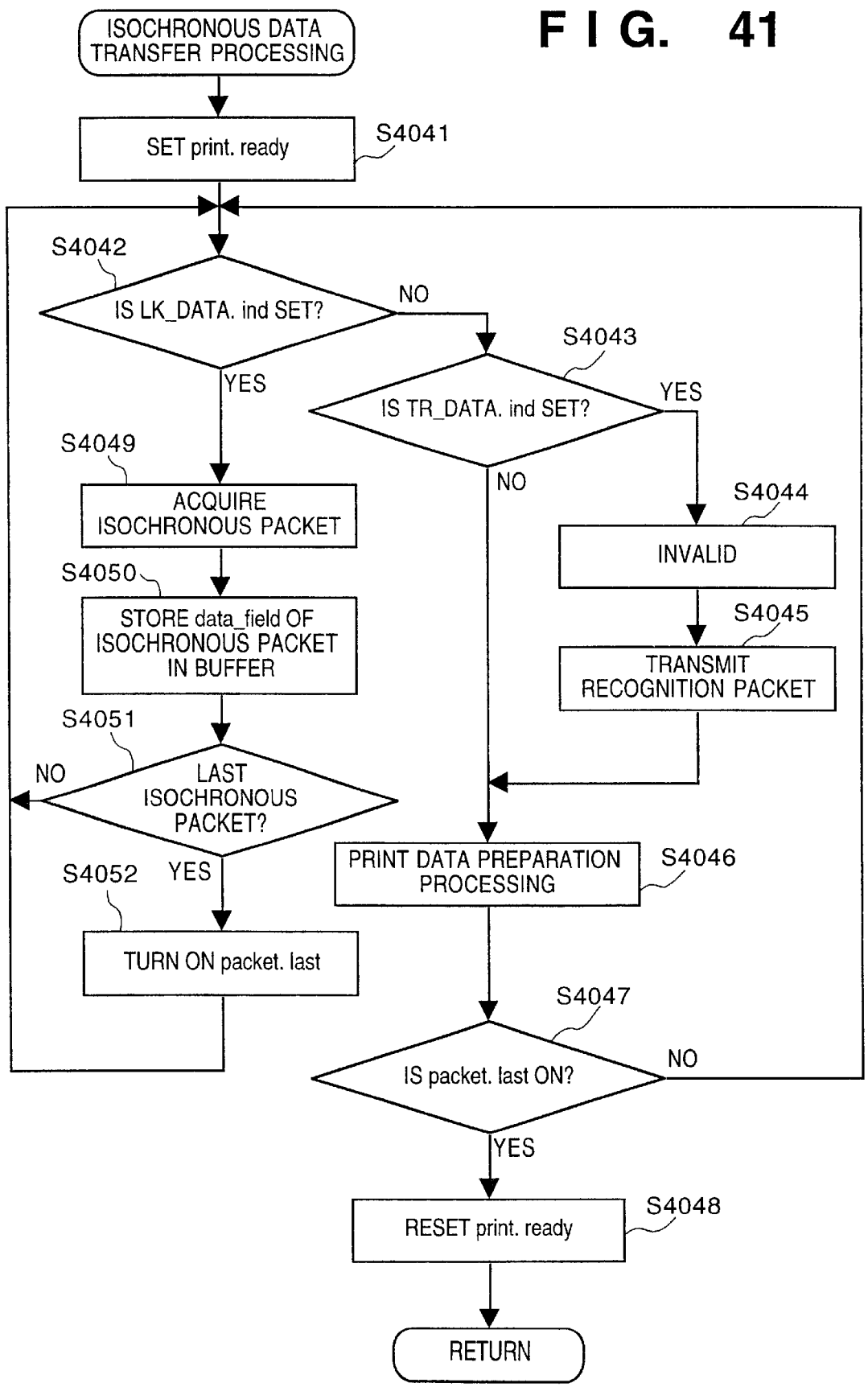
FIG. 41 is a flowchart showing isochronous data transfer processing.

FIG. 41 is a flowchart showing details of isochronous data transfer processing in which print data is received from the host device as an isochronous packet and subjected to printing.

The isochronous data transfer processing is performed after the flag register "print.start" is set. At step S4041, the flag register "print.ready" is set. The "print.ready" indicates that preparation for reception of an isochronous packet is complete and printing can be performed.

The process proceeds to step S4042 to check whether "LK_DATA.ind" has been set. The "LK_DATA.ind" indicates whether the link layer has received an isochronous packet. When the link layer receives an isochronous packet, "LK_DATA.ind" is set. If NO at step S4042, the process proceeds to step S4043 to check "TR_DATA.ind", thereby checking whether an asynchronous packet has been received. No asynchronous packet is received during isochronous data transfer processing. For this reason, if "TR_DATA.ind" is ON, the process proceeds to step S4044 to set "invalid", and then to step S4045 to transmit a recognition packet representing "invalid".

The process proceeds to step S4046 to perform print data preparation processing. In print data preparation processing, for an ink-jet printer, image data to be printed on a predetermined number of lines (to be referred to as a "band" hereinafter) is developed in a band memory in accordance with the print head form. For a page printer such as a laser beam printer, print data of one page is developed in a page memory. The process proceeds to step S4047 to check whether the flag register "packet.last" is ON. The flag register "packet.last" indicates the last isochronous packet sent from the host device. If NO at step S4047, the process returns to step S4042 to repeat isochronous data transfer processing. If YES at step S4047, the "print.ready" is reset, and the process returns to step S4002 shown in FIG. 37.

If YES at step S4042, the process proceeds to step S4049 to acquire the isochronous packet. The isochronous packet is shown in FIG. 24. At step S4050, "data_field" (FIG. 24) as the data portion of the acquired isochronous packet is stored in the buffer. Data stored in the "data_field" is image data to be printed. The process proceeds to step S4051 to check whether the last isochronous packet has been received from the host device. This determination is made on the basis of the value set in "sy" (FIG. 24) of the isochronous packet. The "sy" of the last isochronous packet has a value different from that in "sy" of other isochronous packets. If NO at step S4051, the process returns to step S4042. If YES at step S4051, flag register "packet.last" is turned on at step S4052, and the process returns to step S4042.

Figure 42:
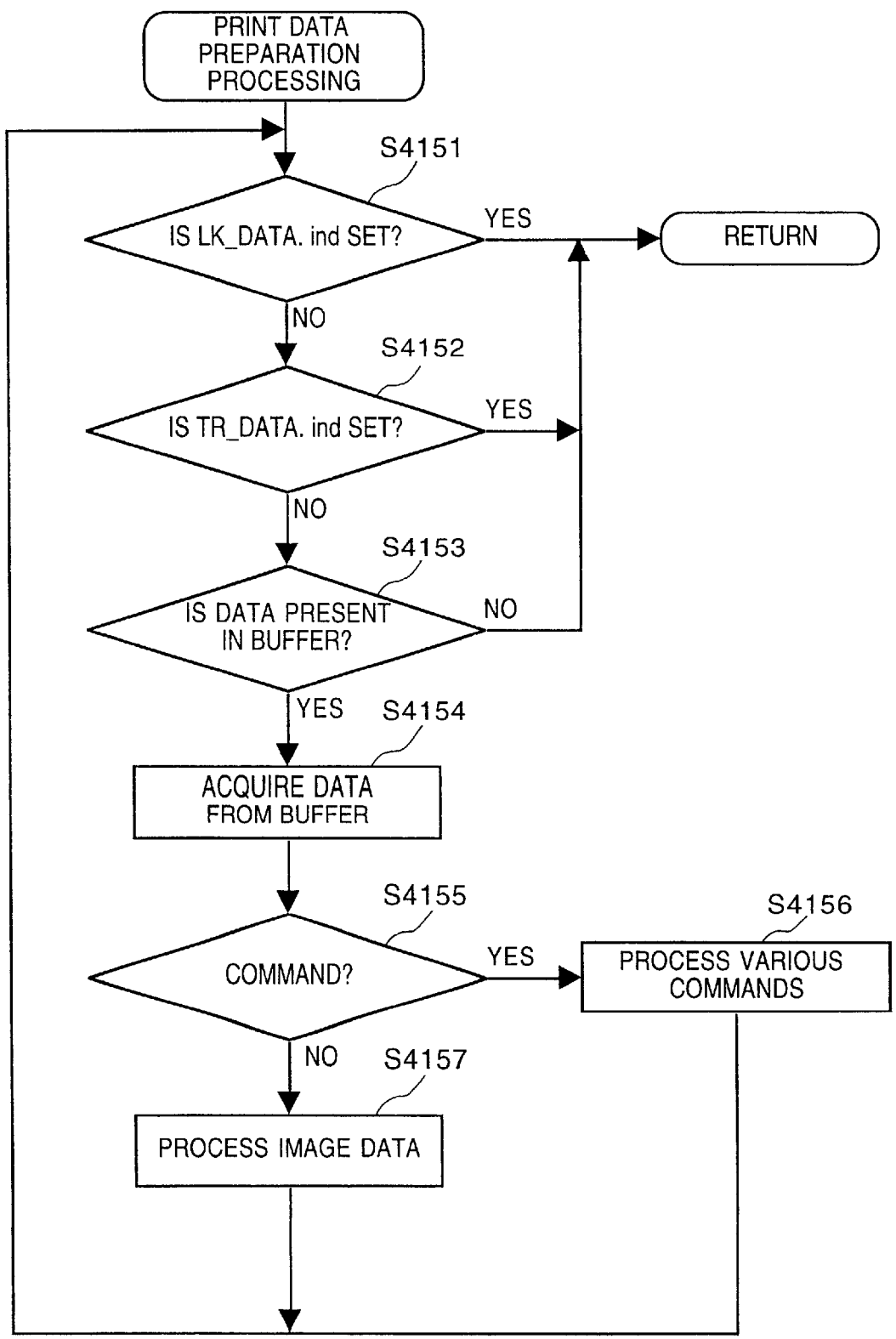
FIG. 42 is a flowchart showing print data preparation processing.

FIG. 42 is a flowchart of print data preparation processing. At step S4151, it is checked whether "LK_DATA.ind" is ON. If YES at step S4151, this means that an isochronous packet has been received, so print data preparation processing is stopped, and the process returned to step S4047 shown in FIG. 41. If NO at step S4151, the process proceeds to step S4152 to check whether "TR_DATA.ind" is ON. If YES at step S4152, this means that an asynchronous packet has been received, so print data preparation processing is stopped, and the process returns to step S4047 shown in FIG. 41.

If NO at step S4152, the process proceeds to step S4153 to check whether data has been stored in the buffer. If NO at step S4153, the process returns to step S4047 shown in FIG. 41. If YES at step S4153, the process proceeds to step S4154 to extract the data from the buffer. The data extracted from the buffer includes image data and various commands such as a line field. It is checked at step S4155 whether the extracted data is a command. If YES at step S4155, the process proceeds to step S4156 to execute processing of various commands. After this, the process returns to step S4151 to repeat processing.

If NO at step S4155, the process proceeds to step S4157 to process image data. By image data processing, the received image data is converted into print data. The process returns to step S4051 to repeat processing.

Asynchronous Data Transfer Processing

Figure 43:
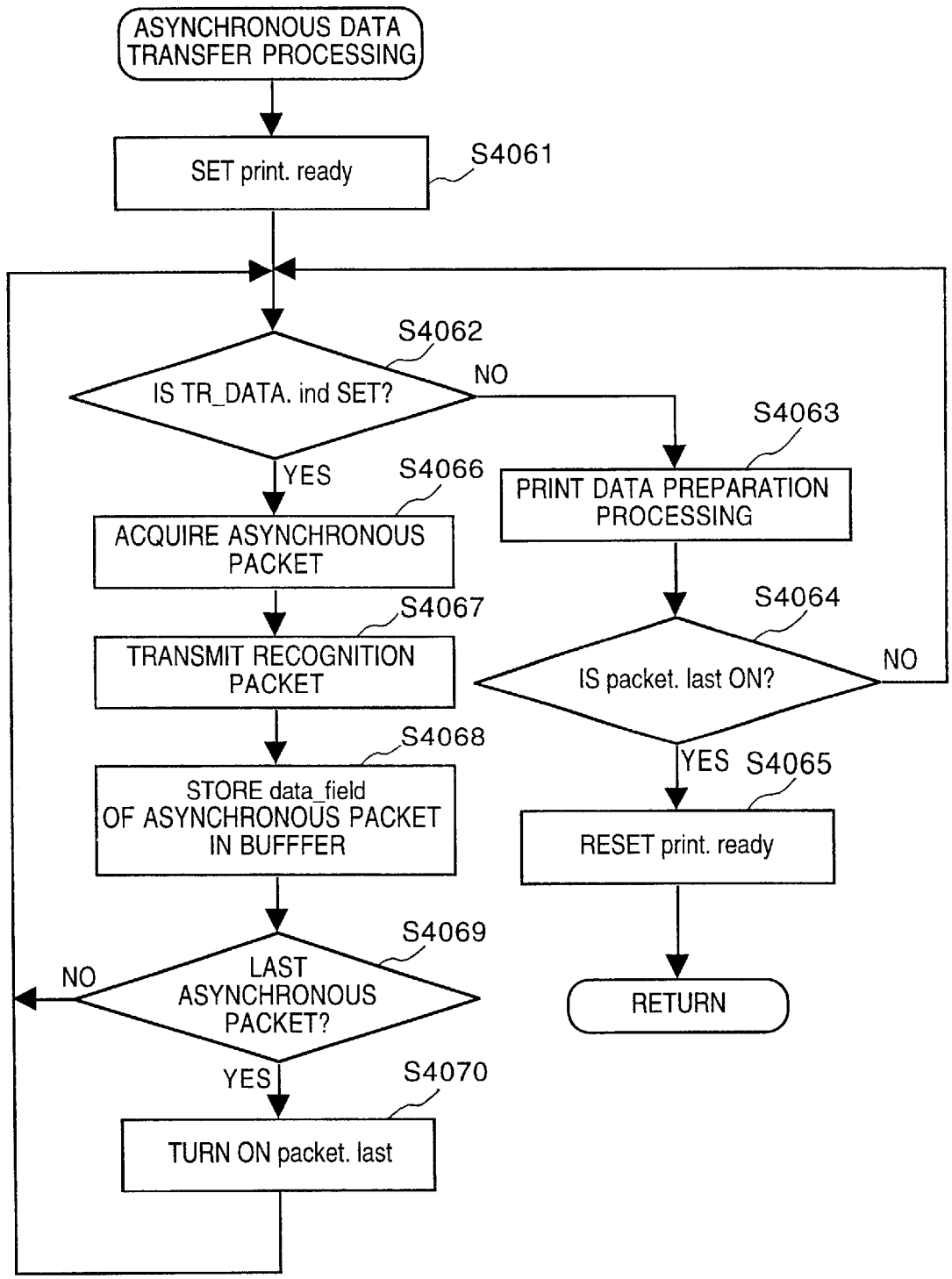
FIG. 43 is a flowchart showing synchronous data transfer processing.

FIG. 43 is a flowchart showing details of asynchronous data transfer processing in which image data is received from the host device as an asynchronous packet and printed.

Asynchronous data transfer processing is performed after the flag register "print.start" is set. At step S4061, the flag register "print.ready" is set. The "print.ready" indicates that preparation for reception of an asynchronous packet is complete and printing can be performed.

The process proceeds to step S4062 to check whether "TR_DATA.ind" is set. The "TR_DATA.ind" indicates whether the transaction layer has received an asynchronous packet. When an asynchronous packet has been received, the "TR_DATA.ind" is set. If NO at step S4062, the process proceeds to step S4063 to perform print data preparation processing shown in FIG. 42.

The process proceeds to step S4064 to check whether the flag register "packet.last" is ON. The flag register "packet.last" indicates whether the last asynchronous packet has been received from the host device. If NO at step S4064, the process returns to step S4062 to repeat processing. If YES at step S4064, the process proceeds to step S4065 to reset the "print.ready", and then returns to step S4002 in FIG. 37.

If YES at step S4062, the process proceeds to step S4066 to acquire the asynchronous packet. The asynchronous packet is shown in FIG. 22. The process proceeds to step S4067 to transmit a recognition packet representing "valid". At step S4068, "data_field" (FIG. 22) as the data portion of the received asynchronous packet is stored in the buffer. Data stored in the "data_field" is image data to be printed.

The process proceeds to step S4069 to check whether the received asynchronous packet is the last asynchronous packet. If NO at step S4069, the process returns to step S4062 to repeat processing. If YES at step S4069, the process proceeds to step S4070 to turn on the "packet.last", and then returns to step S4062 to repeat processing.

As described above, by isochronous data transfer processing shown in FIG. 41, print data preparation processing shown in FIG. 42, and asynchronous data transfer processing shown in FIG. 43, image data and various commands contained in the isochronous packet or asynchronous packet sent from the host device are processed, and print processing based on the image data is executed.

As has been described above, according to the present invention, when a node having the cycle master function is present on the serial bus, data can be transferred by synchronous transfer. When no node having the cycle master function is present, data can be transferred by asynchronous transfer. Even when devices which do not incorporate the cycle master function are connected, data can be transferred, so disadvantages caused when devices without any cycle master function are connected can be prevented. Therefore, so-called direct printing can be realized by omitting the cycle master function from devices such as a printer, a digital still camera, or a digital video camera to reduce the device cost and directly connecting the devices without any cycle master function by the 1394 serial bus.

As many apparently widely different embodiments of the present invention can be made without departing from the spirit and scope thereof, it is to be understood that the invention is not limited to the specific embodiments thereof except as defined in the appended claims.

Modifications of Embodiments

The above embodiments have been described in a case where a network is constructed by using the serial bus based on the IEEE 1394 standards, however, the present invention is not limited to the 1394 serial bus. For example, the present invention is applicable to a network constructed by using an arbitrary serial interface such as a Universal Serial Bus (USB).

Note that in the above embodiments, the printer has been mainly described as a target device or a host device on the network. However, the target device is not limited to the printer but may be any other device such as a monitor, a computer, a digital camera, a scanner, a digital video and an external storage device. Further, the target device is not limited to any special device model.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment/embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment/embodiments are realized by executing the program codes which are read by a computer, the present invention includes a case where an OS (operating system) or the like working on the computer performs a part or entire processes in accordance with designations of the program codes and realizes functions according to the above embodiment/embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment/embodiments.

What is claimed is:

1. An information processing apparatus for controlling data transfer between devices which are connected by a serial bus, wherein the serial bus conforms to a standard that supports isochronous transfer of data and that requires a cycle master function to be performed in order to effect isochronous transfer, said apparatus comprising:

a first determination section, arranged to send a predetermined request to the serial bus, and to determine whether the cycle master function necessary for isochronous transfer is currently available on the serial bus based on a response of a bus manager on the serial bus corresponding to the predetermined request;

a second determination section, arranged to determine whether a destination device of data transfer can perform isochronous transfer; and a setting section, arranged to select a transfer mode from a plurality of transfer modes which include an isochronous transfer mode, so as to perform data transfer with the destination device through the serial bus, in accordance with the determinations made by said first and second determination sections.

2. The apparatus according to claim 1, wherein, when the cycle master function is currently available on the serial bus and the destination device can perform the isochronous transfer, said setting section selects the isochronous transfer mode, and otherwise, selects an asynchronous transfer mode.

3. The apparatus according to claim 1, wherein a node is connected to the bus and provides the cycle master function, and wherein that node generates a synchronous packet for isochronous transfer.

4. The apparatus according to claim 3, wherein the synchronous packet is a cycle start packet.

5. The apparatus according to claim 1, wherein the destination device is a printer.

6. The apparatus according to claim 5, wherein the printer executes print processing based on data transferred by one of isochronous transfer and asynchronous transfer.

7. The apparatus according to claim 1, wherein the serial bus is compatible or complies with the IEEE 1394-1995 standard.

8. An information processing method of controlling data transfer between devices which are connected by a serial bus, wherein the serial bus conforms to a standard that supports isochronous transfer of data and that requires cycle master function to be performed in order to effect isochronous transfer, said method comprising the steps of:

sending a predetermined request to the serial bus;

determining whether the cycle master function necessary for isochronous transfer is currently available on the serial bus based on a response of a bus master on the serial bus corresponding to the predetermined request;

determining whether a destination device of data transfer can performed isochronous transfer; and selecting a transfer mode from a plurality of transfer modes which include an isochronous transfer mode so as to perform data transfer with the destination device through the serial bus, in accordance with the determination made in said determining steps.

9. A computer program product comprising a computer readable medium storing computer program code, for executing information processing of controlling data transfer between devices which are connected by a serial bus, wherein the serial bus conforms to a standard that supports isochronous transfer of data and that requires cycle master function to be performed in order to effect isochronous transfer, said product comprising process procedure codes for:

sending a predetermined request to the serial bus;

determining whether the cycle master function necessary for isochronous transfer is currently available on the serial bus based on a response of a bus manager on the serial bus corresponding to the predetermined request;

determining whether a destination device of data transfer can perform isochronous transfer; and selecting a transfer mode from a plurality of transfer modes which include an isochronous transfer mode so as to perform data transfer with the destination device through the serial bus, in accordance with the determinations made in said determining steps.

10. An information processing apparatus connected with a serial bus, wherein the serial bus conforms to a standard that support isochronous transfer of data and that requires cycle master function to be performed in order to effect isochronous transfer, said apparatus comprising:

an acquisition section, arranged to log in a destination device to which data is to be transferred, and to acquire type information that relates to what type of device is present at the destination device;

a first determination section, arranged to send a predetermined request to the serial bus, and determine whether the cycle master function necessary for isochronous transfer is currently available on the serial bus based on a response of a bus manager on the serial bus corresponding to the predetermined request;

a second determination section, arranged to determine whether the destination device of data transfer can perform isochronous transfer; and a setting section, arranged to select a transfer mode from a plurality of transfer modes which include an isochronous transfer mode, and to set a transfer parameter so as to perform data transfer with the destination device through the serial bus, in accordance with the type information acquired by said acquisition section, and the determination made by said first and second determination section.

11. The apparatus according to claim 10, wherein, when the cycle master function is currently available on the serial bus the destination device can perform isochronous transfer, said setting section selects the isochronous transfer mode, and otherwise, selects an asynchronous transfer mode.

12. The apparatus to claim 10, wherein a node that is connected to the bus providing the cycle master function, and wherein the node is for generating a synchronous packet for isochronous transfer.

13. The apparatus according to claim 12, wherein the synchronous packet is a cycle start packet.

14. The apparatus according to claim 10, wherein one of a data transfer bandwidth and a data transfer packet size is set in accordance with the type information.

15. The apparatus according to claim 10, wherein the destination device is a printer.

16. The apparatus according to claim 15, wherein the printer executes print processing based on data transfer by one of isochronous transfer and asynchronous transfer.

17. The apparatus according to claim 10, wherein the serial bus is compatible or complies with the IEEE 1394-1995 standard.

18. An information processing method of controlling data transfer between devices which are connected by a serial bus, wherein the serial bus conforms to a standard that supports isochronous transfer of data and that requires a cycle master function to be performed in order to effect isochronous transfer, said method comprising the steps of:

logging in a destination device to which data is to be transferred, and acquiring type information that relates to what type of device is at the destination device;

sending a predetermined request to the serial bus;

determining whether the cycle master function necessary for isochronous transfer is currently available on the serial bus based on a response of a bus manager on the serial bus corresponding to the predetermined request;

determining whether the destination device of data transfer can perform isochronous transfer; and selecting a transfer mode from a plurality of transfer modes which include an isochronous transfer mode, and setting a transfer parameter so as to perform data transfer with the destination device through the serial bus, in accordance with the type information acquired by the logging process, and the determination made in said determining steps.

19. A computer program product comprising a computer readable medium storing program code, for executing information processing of controlling data transfer between devices which are connected by a serial bus, wherein the serial bus conforms to a standard supports isochronous transfer of data and that requires cycle master function to be performed in order to effect isochronous transfer, said product comprising process procedure codes for:

logging in a data destination device to which data is to be transferred and acquiring type information that relates to what type of device is present at the destination device;

sending a predetermined request to the serial bus;

determining whether the cycle master function necessary for isochronous transfer is currently available on the serial bus based on a response of a bus manager corresponding to the predetermined request;

determining whether the destination device of data transfer can perform isochronous transfer; and selecting a transfer mode from a plurality of transfer modes which include an isochronous transfer mode, and setting a transfer parameter so as to perform data transfer with the destination device through the serial bus, in accordance with the type information acquired by the logging process, and the determinations made in said determining processes.

* * * * *

UNITED STATES PATENT AND TRADEMARK OFFICE
CERTIFICATE OF CORRECTION

PATENT NO. : 6,771,668 B2
DATED : August 3, 2004
INVENTOR(S) : Koji Fukunaga et al.

It is certified that error appears in the above-identified patent and that said Letters Patent is hereby corrected as shown below:

Column 5,
Line 7, "an" should read -- a --.

Column 6,
Line 57, "its" should read -- their --.

Column 7,
Lines 44 and 67, "notifies" should read -- notifying --;
Line 46, "number" should read -- number request --; and "been" should be deleted;
Line 57, "have" should read -- has --; and
Line 61, "similar" should read -- similarly --.

Column 8,
Line 1, "number" should read -- number request --;
Line 2, "been" should be deleted;
Line 14, "have" should read -- has --;
Line 21, "procedure" should read -- procedure repeats --; and "ID's" should read -- IDs --; and
Line 43, "leave" should read -- leaf --.

Column 9,
Line 4, "become" should be deleted.

Column 10,
Line 2, "the link layer 812," (second occurrence) should be deleted; and
Lines 27 and 32, "is," should read -- is --.

Column 13,
Line 36, "CSP's" should read -- CSPs --.

Column 27,
Line 27, "performed" should read -- perform --; and
Line 57, "support" should read -- supports --.

Column 28,
Line 22, "apparatus" should read -- apparatus according --.

UNITED STATES PATENT AND TRADEMARK OFFICE
CERTIFICATE OF CORRECTION

PATENT NO. : 6,771,668 B2
DATED : August 3, 2004
INVENTOR(S) : Koji Fukunaga et al.

It is certified that error appears in the above-identified patent and that said Letters Patent is hereby corrected as shown below:

Column 29,
Line 5, "standard" should read -- standard that --.

Signed and Sealed this

Sixteenth Day of November, 2004

JON W. DUDAS
*Director of the United States Patent and Trademark Office*